(12) United States Patent
Nakamura et al.

(10) Patent No.: US 9,116,305 B2
(45) Date of Patent: Aug. 25, 2015

(54) ARRAYED WAVEGUIDE GRATING, OPTICAL MODULE PROVIDED WITH SAID ARRAYED WAVEGUIDE GRATING, AND OPTICAL COMMUNICATIONS SYSTEM

(71) Applicant: NIPPON TELEGRAPH AND TELEPHONE CORPORATION, Tokyo (JP)

(72) Inventors: Hirotaka Nakamura, Yokosuka (JP); Shinya Tamaki, Yokosuka (JP); Shunji Kimura, Yokosuka (JP); Takayuki Mizuno, Atsugi (JP); Hiroshi Takahashi, Atsugi (JP); Mikitaka Itoh, Atsugi (JP); Tsutomu Kitoh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/364,198

(22) PCT Filed: Dec. 28, 2012

(86) PCT No.: PCT/JP2012/084104
§ 371 (c)(1),
(2) Date: Jun. 10, 2014

(87) PCT Pub. No.: WO2013/105466
PCT Pub. Date: Jul. 18, 2013

(65) Prior Publication Data
US 2014/0376861 A1    Dec. 25, 2014

(30) Foreign Application Priority Data

Jan. 13, 2012    (JP) ................................. 2012-005071

(51) Int. Cl.
*G02B 6/34*    (2006.01)
*G02B 6/12*    (2006.01)

(52) U.S. Cl.
CPC .............. *G02B 6/34* (2013.01); *G02B 6/12014* (2013.01); *G02B 6/12016* (2013.01)

(58) Field of Classification Search
CPC ............... G02B 6/124; G02B 6/02085; G02B 6/12007; G02B 6/4214; G02B 6/262; G02B 6/4298
USPC .......................................... 385/14, 15, 31, 37
See application file for complete search history.

(56) References Cited

U.S. PATENT DOCUMENTS

| | | | |
|---|---|---|---|
| 6,760,521 B2 * | 7/2004 | Watanabe | 385/50 |
| 8,538,212 B2 * | 9/2013 | McGinnis | 385/37 |

(Continued)

FOREIGN PATENT DOCUMENTS

| | | |
|---|---|---|
| JP | 08234029 | 9/1996 |
| JP | 09297228 | 11/1997 |

(Continued)

OTHER PUBLICATIONS

International Search Report dated Feb. 12, 2003 corresponding to PCT/JP2012/084104 with English translation, 5 pp.

(Continued)

*Primary Examiner* — Ellen Kim
(74) *Attorney, Agent, or Firm* — Ohlandt, Greeley, Ruggiero & Perle, L.L.P.

(57) ABSTRACT

An arrayed waveguide grating provided with a first slab waveguide formed on a substrate; a second slab waveguide formed on the substrate; a first input/output waveguide connected to the first slab waveguide; a second input/output waveguide connected to the second slab waveguide; two or more channel waveguide groups connecting the first and second slab waveguides, each of the channel waveguide groups formed of an aggregate of a plurality of channel waveguides having path lengths sequentially becoming longer by a predetermined path length difference; and an optical filter arranged in at least one of the first and second slab waveguides.

10 Claims, 29 Drawing Sheets

(56) References Cited

U.S. PATENT DOCUMENTS

| | | | |
|---|---|---|---|
| 2002/0044742 A1* | 4/2002 | Yoneda | 385/37 |
| 2002/0168146 A1* | 11/2002 | Watanabe | 385/50 |
| 2008/0131054 A1* | 6/2008 | Kim et al. | 385/46 |

FOREIGN PATENT DOCUMENTS

| | | |
|---|---|---|
| JP | 10104446 | 4/1998 |
| JP | 2000241638 | 9/2000 |
| JP | 2000298219 | 10/2000 |
| JP | 2005003891 | 1/2005 |
| JP | 2005148585 | 6/2005 |
| WO | 2009122577 A1 | 10/2009 |

OTHER PUBLICATIONS

Hirotaka, et al., "40Gbit/s lambda-tunable stacked-WDM/TDN-PON using dynamic wavelength and bandwidth allocation", Optical Society of America, 2011, 3 pp.

International Preliminary Report on Patentability dated Jul. 24, 2014 corresponding to PCT/JP2012/084104, 11 pp.

* cited by examiner

| INPUT PORT | WAVELENGTH | OUTPUT PORT |
|---|---|---|
| I1 | $\lambda a1$ | O1 |
| | $\lambda a2$ | O2 |
| | $\lambda a3$ | O3 |
| | $\lambda a4$ | O4 |
| | ... | ... |
| | $\lambda an$ | On |
| I2 | $\lambda an$ | O1 |
| | $\lambda a1$ | O2 |
| | $\lambda a2$ | O3 |
| | $\lambda a3$ | O4 |
| | ... | ... |
| | $\lambda a(n-1)$ | On |
| I3 | $\lambda a(n-1)$ | O1 |
| | $\lambda an$ | O2 |
| | $\lambda a1$ | O3 |
| | $\lambda a2$ | O4 |
| | ... | ... |
| | $\lambda a(n-2)$ | On |
| ... | ... | ... |
| In | $\lambda a2$ | O1 |
| | $\lambda a3$ | O2 |
| | $\lambda a4$ | O3 |
| | $\lambda a5$ | O4 |
| | ... | ... |
| | $\lambda a1$ | On |

FIG. 23(a)

| INPUT PORT | WAVELENGTH | OUTPUT PORT |
|---|---|---|
| I1 | $\lambda b1$ | O1 |
|  | $\lambda b2$ | O2 |
|  | $\lambda b3$ | O3 |
|  | $\lambda b4$ | O4 |
|  | ... | ... |
|  | $\lambda bn$ | On |
| I2 | $\lambda bn$ | O1 |
|  | $\lambda b1$ | O2 |
|  | $\lambda b2$ | O3 |
|  | $\lambda b3$ | O4 |
|  | ... | ... |
|  | $\lambda b(n-1)$ | On |
| I3 | $\lambda b(n-1)$ | O1 |
|  | $\lambda bn$ | O2 |
|  | $\lambda b1$ | O3 |
|  | $\lambda b2$ | O4 |
|  | ... | ... |
|  | $\lambda b(n-2)$ | On |
| ... | ... | ... |
| In | $\lambda b2$ | O1 |
|  | $\lambda b3$ | O2 |
|  | $\lambda b4$ | O3 |
|  | $\lambda b5$ | O4 |
|  | ... | ... |
|  | $\lambda b1$ | On |

FIG. 23(b)

| INPUT PORT | WAVELENGTH | OUTPUT PORT |
|---|---|---|
| I1 | $\lambda a1$ | P1 |
| | $\lambda a2$ | P2 |
| | $\lambda a3$ | P3 |
| | $\lambda a4$ | P4 |
| | ... | ... |
| | $\lambda an$ | Pn |
| I2 | $\lambda an$ | P1 |
| | $\lambda a1$ | P2 |
| | $\lambda a2$ | P3 |
| | $\lambda a3$ | P4 |
| | ... | ... |
| | $\lambda a(n-1)$ | Pn |
| I3 | $\lambda a(n-1)$ | P1 |
| | $\lambda an$ | P2 |
| | $\lambda a1$ | P3 |
| | $\lambda a2$ | P4 |
| | ... | ... |
| | $\lambda a(n-2)$ | Pn |
| ... | ... | ... |
| In | $\lambda a2$ | P1 |
| | $\lambda a3$ | P2 |
| | $\lambda a4$ | P3 |
| | $\lambda a5$ | P4 |
| | ... | ... |
| | $\lambda a1$ | Pn |

| INPUT PORT | WAVELENGTH | OUTPUT PORT |
|---|---|---|
| I1 | $\lambda b1$ | Q1 |
| | $\lambda b2$ | Q2 |
| | $\lambda b3$ | Q3 |
| | $\lambda b4$ | Q4 |
| | ... | ... |
| | $\lambda bn$ | Qn |
| I2 | $\lambda bn$ | Q1 |
| | $\lambda b1$ | Q2 |
| | $\lambda b2$ | Q3 |
| | $\lambda b3$ | Q4 |
| | ... | ... |
| | $\lambda b(n-1)$ | Qn |
| I3 | $\lambda b(n-1)$ | Q1 |
| | $\lambda bn$ | Q2 |
| | $\lambda b1$ | Q3 |
| | $\lambda b2$ | Q4 |
| | ... | ... |
| | $\lambda b(n-2)$ | Qn |
| ... | ... | ... |
| In | $\lambda b2$ | Q1 |
| | $\lambda b3$ | Q2 |
| | $\lambda b4$ | Q3 |
| | $\lambda b5$ | Q4 |
| | ... | ... |
| | $\lambda b1$ | Qn |

FIG. 25

|  | AWG1 | AWG2 |
|---|---|---|
|  | 1.3 μ BAND | 1.5 μ BAND |
| INPUT/OUTPUT PITCH | D | |
| SLAB LENGTH | $L_f$ | |
| NUMBER OF WAVELENGTHS OF AWG | $Nch_1$ | $Nch_2$ |
| SLAB REFRACTIVE INDEX | $ns_1$ | $ns_2$ |
| ARRAY PITCH | $d_1$ | $d_2$ |
| CENTRAL WAVELENGTH | $\lambda c_1$ | $\lambda c_2$ |

ARRAYED WAVEGUIDE GRATING, OPTICAL MODULE PROVIDED WITH SAID ARRAYED WAVEGUIDE GRATING, AND OPTICAL COMMUNICATIONS SYSTEM

TECHNICAL FIELD

The present invention relates to an arrayed waveguide grating, an optical module provided with the arrayed waveguide grating, and an optical communications system. In more detail, this relates to optical multiplexing/demultiplexing for wavelength multiplexed communication and relates to the arrayed waveguide grating which becomes an optical multiplexing/demultiplexing circuit capable of distributing optical signals of different wavelength bands with different wavelength intervals, the optical module provided with the arrayed waveguide grating, and the optical communications system.

BACKGROUND ART

A high-capacity, sophisticated, and economic access service system is demanded in association with recent rapid diffusion of the Internet, and research of passive optical network (PON) is underway as means for realizing it. The PON is a system of inserting a branching unit in the middle of an optical fiber network to bring one optical fiber into a plurality of subscriber homes and an optical communications system to share one center device and a part of a transmission path by a plurality of users by using an optical multiplexer/demultiplexer by an optical passive element for an economic purpose.

In Japan, an economic optical communications system to share a 1 Gbps circuit capacity by up to 32 users by time division multiplexing (TDM) and a so-called Gigabit Ethernet™ PON (GE-PON) are currently mainly introduced. According to this, a FTTH (fiber to the home) service is provided at a realistic cost.

In order to respond to larger capacity needs, research of 10GE-PON with a 10 Gbps-level entire bandwidth is underway as a next-generation optical access system and international standardization thereof was completed in 2009 ($21^{st}$ year of Heisei). This is the optical communications system which realizes the large capacity while using the same transmission path such as the optical fiber as that of the GE-PON by increasing a bit rate of a transmitter-receiver. It is considered that a 10 G-level or larger capacity will be demanded for an ultra high-definition video service, a ubiquitous service and the like in the future, but there is a problem that realization thereof is difficult due to increase in cost for system upgrading only by simply increasing the bit rate of the transmitter/receiver from a 10 G level to a 40/100 G level.

A wavelength-variable WDM/TDM-PON in which wavelength variability is added to the transmitter/receiver and the above-described time division multiplexing (TDM) and wavelength division multiplexing (WDM) are effectively combined such that the transmitter/receivers in a center station device may be expanded gradually according to bandwidth requirement is reported (for example, refer to Non-Patent Literature 1) as technology to solve such problem. In realization of a system of such wavelength-variable WDM/TDM-PON, an unused wavelength is used such that this may coexist with a conventional system, and for realizing the same at a low cost, it is considered to use a wavelength-variable optical transmitter of a broad wavelength interval of 1.3 μm band in a user side device and use a wavelength-variable optical transmitter of a narrow wavelength interval of 1.5 μm band on a center device side. A wavelength optical multiplexer/demultiplexer is required for performing wavelength distribution of the signal light with the broad wavelength interval of 1.3 μm band and the signal light with the narrow wavelength interval of 1.5 μm band, so that it is considered to use the arrayed waveguide grating as such wavelength optical multiplexer/demultiplexer.

The arrayed wavelength grating being the wavelength optical multiplexer/demultiplexer is formed of an input waveguide, an input side slab waveguide, an output waveguide, an output side slab waveguide, and a channel waveguide group connecting the input side slab waveguide and the output side slab waveguide, and the channel waveguide group is formed of a plurality of channel waveguides having path lengths sequentially becoming longer by a predetermined path length difference (refer to Patent Literatures 1, 2, or 3, for example). Such arrayed waveguide grating may set the wavelength band and wavelength interval according to the system to which this is applied and the arrayed waveguide grating of the 1.3 μm band broad wavelength interval, the arrayed wavelength grating of the 1.5 μm band narrow wavelength interval and the like are reported, for example. However, the wavelength interval of the arrayed waveguide grating depends on the path length difference of the channel waveguide group, so that the arrayed waveguide grating capable of distributing the signal light with the broad wavelength interval in the 1.3 μm band and that with the narrow wavelength interval in the 1.5 μm band cannot be realized by the conventional technology.

Therefore, it is considered to use the arrayed waveguide grating having a function to perform the wavelength distribution of the signal light of the 1.3 μm band (wavelength band A) with the broad wavelength interval (wavelength interval X) and the arrayed waveguide grating which performs the wavelength distribution of the signal light of the 1.5 μm band (wavelength band B) with the narrow wavelength interval (wavelength interval Y) in combination as the arrayed waveguide grating capable of distributing the signal light with the broad wavelength interval in the 1.3 μm band and that with the narrow wavelength interval in the 1.5 μm band and connect input/output ports of the arrayed waveguide gratings through optical filters, and this is examined.

FIG. 22 is a schematic diagram of an example of a conventional wavelength distributor H in which two arrayed waveguide gratings 302 and 303 and a number of optical filters 301 and 304 connecting the input/output ports are combined. Such wavelength distributor H is formed of a plurality of optical filters 301, the arrayed waveguide grating 302, the arrayed waveguide grating 303, a plurality of optical filters 304, and optical fibers 307 for connecting the optical filters 301 and 304 and input waveguides or output waveguides of the arrayed waveguide gratings 302 and 303.

Meanwhile, in the following description, the signal light incident from a side of an input/output port 305 of the wavelength distributor H to be emitted to a side of the input/output port 306 is referred to as an upstream signal and the signal light incident from the side of the input/output port 306 to be emitted to the side of the input/output port 305 is referred to as a downstream signal. As the signal light, a case in which the number of the input/output ports 305 and the number of the input/output ports 306 are N, the signal light of the wavelength band A $\{\lambda_{a1}, \lambda_{a2}, \ldots \lambda_{aN}$; wavelength interval X$\}$ is on a shorter wavelength side than the signal light of the wavelength band B $\{\lambda_{b1}, \lambda_{b2}, \ldots \lambda_{bN}$; wavelength interval Y$\}$, and the wavelength interval X is larger than the wavelength interval Y is described as an example, and a case in which the optical filters 301 and 304 are formed of thin-membrane filters (optical interference filters) having characteristic illustrated in FIGS. 2 and 3 described later (for example, refer to Patent Literature 4) is described.

The signal light $\{\lambda_{b1}, \lambda_{b2}, \ldots \lambda_{bn}\}$ incident from $I_1$ of the input/output port 305 passes through the thin-membrane filter in an optical filter 301-1 and arrives at the arrayed waveguide grating 302 for the narrow wavelength interval. Each signal light is distributed to optical filters 304-1 to 304-$n$ by the arrayed waveguide grating 302. Each distributed signal light passes through the thin-membrane filter in the optical filter 304 to be emitted to $O_1$ to $O_n$ of the input/output port 306.

The signal light $\{\lambda_{b1}, \lambda_{b2}, \ldots \lambda_{bn}\}$ incident from $I_2$ of the input/output port 305 passes through the thin-membrane filter in the optical filter 301-1 and arrives at the arrayed waveguide grating 302 for the narrow wavelength interval. Each signal light is distributed to the optical filters 304-2, 304-3, . . . , 304-$n$, and 304-1 by a cyclic property of the arrayed waveguide grating 302. Each distributed signal light passes through the thin-membrane filter in the optical filter 304 to be emitted to $O_2, O_3, \ldots, O_n$, and $O_1$ of the input/output port 306. The same applies to the signal light $\{\lambda_{b1}, \lambda_{b2}, \ldots \lambda_{bn}\}$ incident from $I_3$ to $I_n$ of the input/output port 305 and this is wavelength-distributed as illustrated in FIG. 23($b$) described later.

The signal light $\{\lambda_{a1}, \lambda_{a2}, \ldots \lambda_{an}\}$ incident from $I_1$ of the input/output port 305 is reflected by the thin membrane filter in the optical filter 301-1 and arrives at the arrayed waveguide grating 303 for the broad wavelength interval. Each signal light is distributed to the optical filters 304-1 to 304-$n$ by the arrayed waveguide grating 303. Each distributed signal light is reflected by the thin membrane filter in the optical filter 304 to be emitted to $O_1$ to $O_n$ of the input/output port 306.

The signal light $\{\lambda_{a1}, \lambda_{a2}, \ldots \lambda_{an}\}$ incident from $I_2$ of the input/output port 305 is reflected by the thin-membrane filter in the optical filter 301-1 and arrives at the arrayed waveguide grating 303 for the broad wavelength interval. Each signal light is distributed to the optical filters 304-2, 304-3, . . . , 304-$n$, and 304-1 by the cyclic property of the arrayed waveguide grating 303. Each distributed signal light is reflected by the thin-membrane filter in the optical filter 304 to be emitted to $O_2, O_3, \ldots, O_n$, and $O_1$ of the input/output port 306. The same applies to the signal light $\{\lambda_{a1}, \lambda_{a2}, \ldots \lambda_{an}\}$ incident from $I_3$ to $I_n$ of the input/output port 305 and this is wavelength-distributed as illustrated in FIG. 23($a$) described later.

Meanwhile, when the signal light is incident from the side of the input/output port 306 to be emitted from the side of the input/output port 305 by reversibility of a travel direction of light, the above-described wavelength distribution may also satisfy a correspondence relationship in FIGS. 23($a$) and 23($b$) to be described later.

In this manner, the upstream signal of a short wavelength band with the broad wavelength interval and the downstream signal of a long wavelength band with the narrow wavelength interval are wavelength-distributed bi-directionally over a signal fiber by the wavelength distributor H which is illustrated in FIG. 22 as an example.

CITATION LIST

Non-Patent Literature

Non-Patent Literature 1: H. Nakamura, et al., OFC2011, OThT4, 2011

Patent Literature

Patent Literature 1: JP 1997-297228 A
Patent Literature 2: JP 1998-104446 A
Patent Literature 3: JP 2005-148585 A
Patent Literature 4: JP 1996-234029 A

SUMMARY OF INVENTION

Technical Problem

It is supposed that such wavelength distributor H is arranged in a limited space in a communication carrier station, so that it is strongly desired to make this miniaturize. In contrast, in the above-described wavelength distributor by the conventional technology, it is required to combine the optical filter, the arrayed waveguide grating of the narrow wavelength interval, and the arrayed waveguide grating of the broad wavelength interval and connect them by the optical fiber to make a device, so that a footprint thereof is problematically large. In addition, the conventional wavelength distributor includes a large number of components and a cost thereof becomes high, so that it is desired to improve this.

Therefore, the present invention is achieved in view of such a condition and an object thereof is to provide a miniaturized arrayed waveguide grating capable of performing wavelength distribution of optical signals of different wavelength bands with different wavelength intervals bi-directionally over a single fiber at a low cost, an optical module provided with the arrayed waveguide grating, and an optical communications system.

Solution to Problem

In order to achieve the above-described object, the arrayed waveguide grating is provided with two or more channel waveguide groups for multiplexing and demultiplexing.

Specifically, according to the present invention, there is provided an arrayed waveguide grating including: a first slab waveguide formed on a substrate; a second slab waveguide formed on the substrate; a first input/output waveguide connected to the first slab waveguide; a second input/output waveguide connected to the second slab waveguide; two or more channel waveguide groups connecting the first and second slab waveguides, each of the channel waveguide groups formed of an aggregate of a plurality of channel waveguides having path lengths sequentially becoming longer by a predetermined path length difference; and an optical filter arranged in at least one of the first and second slab waveguides.

According to the present invention, it is possible to perform wavelength distribution of wavelength-multiplexed signal light of different wavebands with different waveband intervals in a single planar lightwave circuit by the configuration in which the optical filter is arranged in at least one of the first and second slab waveguides formed on the substrate provided with the two or more channel waveguide groups, so that a miniaturized arrayed waveguide grating may be realized at a low cost.

In the arrayed waveguide grating according to the present invention, the optical filter demultiplexes signal light input from the first input waveguide connected to the first slab waveguide or the second input waveguide connected to the second slab waveguide, the first or second slab waveguide in which the optical filter is arranged, to the two or more channel waveguide groups for each wavelength band, or multiplexes the signal light input from the two or more channel waveguide groups for each wavelength band to the first input waveguide connected to the first slab waveguide or the second input waveguide connected to the second slab waveguide, the first or second slab waveguide in which the optical filter is arranged.

In the arrayed waveguide grating according to the present invention, the two or more channel waveguide groups have different path lengths differences.

In the arrayed waveguide grating according to the present invention, connections to the channel waveguide groups are formed in the first and second slab waveguides, and the number of the connections is the same as the number of the channel waveguide groups.

In the arrayed waveguide grating according to the present invention, at least either of two slab central axes formed in the first slab waveguide or two slab central axes formed in the second slab waveguide are orthogonal to each other.

In the arrayed waveguide grating according to the present invention, at least one of an angle between two slab central axes formed in the first slab waveguide on a side interposed between the channel waveguide groups and an angle between two slab central axes formed in the second slab waveguide on a side interposed between the channel waveguide groups is smaller than 90 degrees.

In the arrayed waveguide grating according to present invention, at least either of two slab lengths in the first slab waveguide or two slab lengths in the second slab waveguide are the same.

In the arrayed waveguide grating according to present invention, a central axis on a side of the first input/output waveguide or a central axis on a side of the second input/output waveguide is shifted from a central axis on a side of the channel waveguide group by an amount of a shift of an optical path generated by passage through the optical filter of light passing through the optical filter in any of the first and second slab waveguides in which the optical filter is arranged.

An optical module according to the present invention includes: the arrayed waveguide grating according to the invention; a first fiber block in which at least one fiber is held connected to the first input/output waveguide forming the arrayed waveguide grating; a second fiber block in which at least one optical fiber is held connected to the second input/output waveguide forming the arrayed waveguide grating; a first optical connector connected to the first fiber block; and a second optical connector connected to the second fiber block.

An optical communications system according to the present invention includes: the arrayed waveguide grating according to the invention; a subscriber device; and a station side device, wherein the arrayed waveguide grating, the subscriber device, and the station side device are connected by means of an optical fiber, and a wavelength band and a wavelength interval of signal light input from one input/output waveguide group in the arrayed waveguide grating are different from a wavelength band and a wavelength interval of signal light input from the other input/output waveguide group.

Effects of Invention

According to an arrayed waveguide grating according to the present invention, it is possible to perform wavelength distribution of wavelength-multiplexed signal light of different wavelength bands with different wavelength intervals in a single planar lightwave circuit by a configuration in which an optical filter is arranged in at least one of first and second slab waveguides formed on a substrate provided with two or more channel waveguide groups, so that a miniaturized arrayed waveguide grating may be realized at a low cost.

An optical module according to the present invention is provided with the above-described arrayed waveguide grating according to the present invention, so that it is possible to use this as the optical module capable of inputting and outputting signal light from outside to and from the arrayed waveguide grating by enjoying an effect of the arrayed waveguide grating.

An optical communications system according to the present invention is provided with the above-described arrayed waveguide grating according to the present invention, so that it is possible to enjoy the effect of the arrayed waveguide grating to realize a wavelength-variable WDM/TDM-PON at a low cost.

BRIEF DESCRIPTION OF DRAWINGS

FIG. 23(a) is a view illustrating an example of a wavelength distribution characteristic.

FIG. 23 (b) is a view illustrating an example of a wavelength distribution characteristic.

FIG. 24(a) is a view illustrating an example of the wavelength distribution characteristic.

FIG. 24(b) is a view illustrating an example of the wavelength distribution characteristic.

FIG. 25 is a view illustrating an example of the wavelength distribution characteristic.

DESCRIPTION OF EMBODIMENTS

Embodiments of the present invention are described with reference to the attached drawings. The embodiments hereinafter described are examples of exploitation of the present invention and the present invention is not limited to the following embodiments. Meanwhile, components with the same reference signs in this specification and the drawings represent the same components. The embodiments may be combined with one another as far as possible.

First Embodiment

Figure 1:
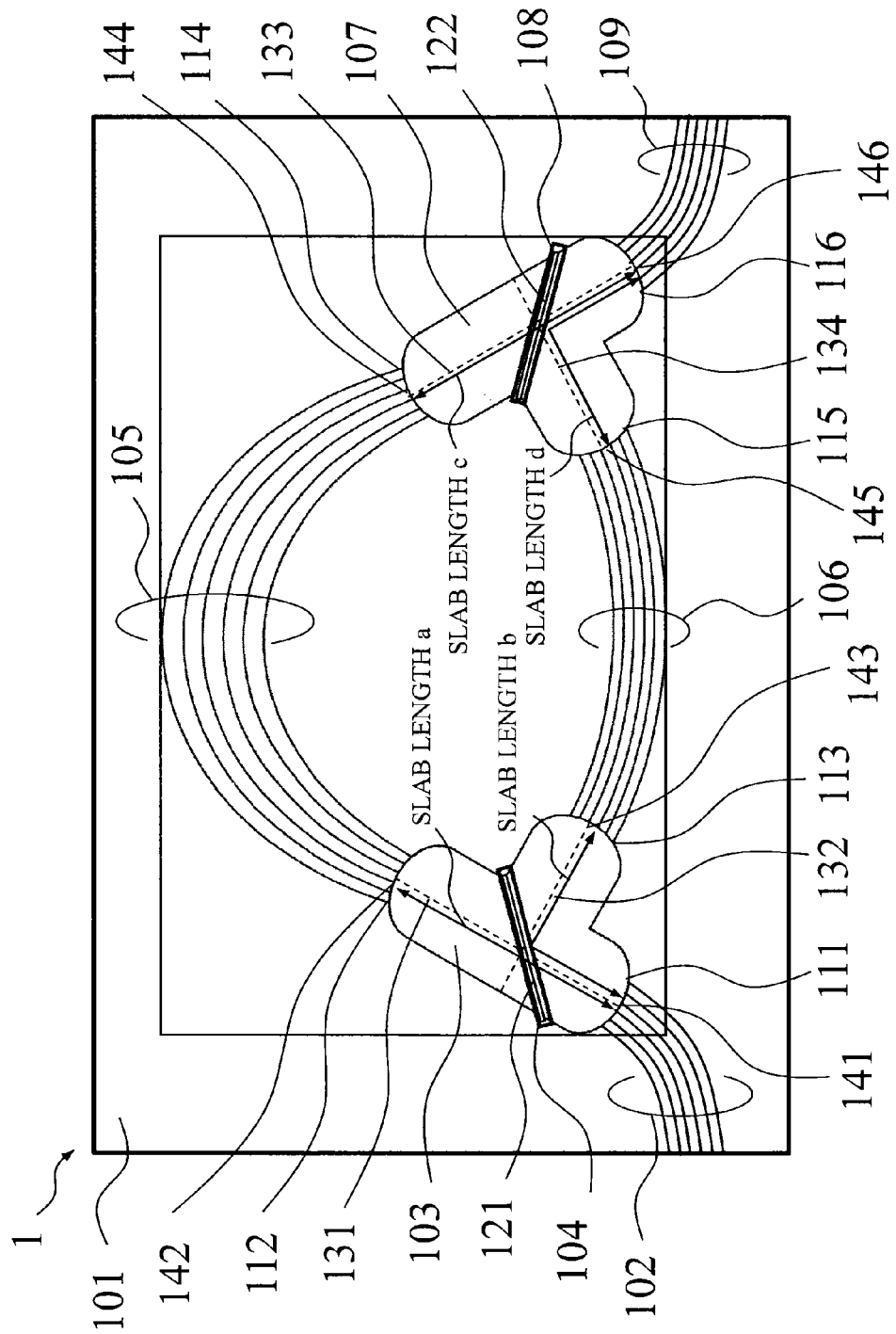
FIG. 1 is a schematic diagram of an arrayed waveguide grating according to a first embodiment of the present invention.

FIG. 1 is a schematic diagram of an aspect of an arrayed waveguide grating 1 according to the first embodiment of the present invention. As illustrated in FIG. 1, the arrayed waveguide grating 1 according to a first embodiment of the present invention is a both-side input/output waveguide integrated arrayed waveguide grating 1 in which a first slab waveguide 103, a second slab waveguide 107, a first input/output waveguide 102 connected to the first slab waveguide 103, a second input/output waveguide 109 connected to the second slab waveguide 107, a first channel waveguide group 105 with both ends connected to the first slab waveguide 103 and the second slab waveguide 107, and a second channel waveguide group 106 with both ends connected to the first slab waveguide 103 and the second slab waveguide 107 are formed on a substrate 101 formed of a silicon substrate, a glass substrate and the like.

Each of the first channel waveguide group 105 and the second channel waveguide group 106 forming the arrayed waveguide grating 1 is formed of a plurality of channel waveguides having path lengths sequentially becoming longer by a predetermined path length difference. An optical filter 121 formed of an interference membrane filter being an optical filter is embedded to be arranged in a slit 104 formed in a part of the first slab waveguide 103 forming the arrayed waveguide grating 1 and an optical filter 122 formed of an interference membrane filter is also embedded to be arranged in a slit 108 formed in a part of the second slab waveguide 107.

Meanwhile, in FIG. 1, a connection part between the first input/output waveguide 102 and the first slab waveguide 103 is a connection 111, a connection part between the second input/output waveguide 109 and the second slab waveguide 107 is a connection 116, a connection part between the first slab waveguide 103 and the first channel waveguide group 105 is a connection 112, a connection part between the first slab waveguide 103 and the second channel waveguide group 106 is a connection 113, a connection part between the second slab waveguide 107 and the first channel waveguide group 105 is a connection 114, and a connection part between the second slab waveguide 107 and the second channel waveguide group 106 is a connection 115.

Two slab central axes 131 and 132 are formed in the first slab waveguide 103. The one slab central axis 131 is the axis connecting a center of curvature 141 on the connection 111 between the first input/output waveguide 102 and the first slab waveguide 103 and a center of curvature 142 on the connection 112 between the first channel waveguide group 105 and the first slab waveguide 103, and the other slab central axis 132 is the axis connecting a center of curvature 143 on the connection 113 between the second channel waveguide group 106 and the first slab waveguide 103 and an intersection between the above-described one slab central axis 131 and the optical filter 121 arranged in the first slab waveguide 103 (and an elongated axis thereof).

Similarly, two slab central axes 133 and 134 are formed also in the second slab waveguide 107. The one slab central axis 133 is the axis connecting a center of curvature 146 on the connection 116 between the second input/output waveguide 109 and the second slab waveguide 107 and a center of curvature 144 on the connection 114 between the first channel waveguide group 105 and the second slab waveguide 107, and the other slab central axis 134 is the axis connecting a center of curvature 145 on the connection 115 between the second channel waveguide group 106 and the second slab waveguide 107 and an intersection between the above-described one slab central axis 133 and the optical filter 122 arranged in the second slab waveguide 107 (and an elongated axis thereof).

As illustrated in FIG. 1, the two channel waveguides (the first channel waveguide group 105 and the second channel waveguide group 106) are formed in the arrayed waveguide grating 1 according to this embodiment. The two connections as many as the channel waveguide groups which are the connection 112 to the first channel waveguide group 105 and the connection 113 to the second channel waveguide group 106 are formed in the first slab waveguide 103. Similarly, the two connections as many as the channel waveguide groups which are the connection 114 to the first channel waveguide group 105 and the connection 115 to the second channel waveguide group 106 are formed also in the second slab waveguide 107.

The first channel waveguide group 105 forming the arrayed waveguide grating 1 according to this embodiment is formed such that the lengths thereof sequentially become longer by a predetermined waveguide path length difference $\Delta L$ and the second channel waveguide group 106 is formed such that the lengths thereof sequentially become longer by a predetermined waveguide path length difference $\Delta L'$. Herein, in a case in which a relationship between the waveguide path length differences $\Delta L$ and $\Delta L'$ satisfies $\Delta L > \Delta L'$ as an example, the first channel waveguide group 105 has a characteristic to transmit signal light with a wavelength interval narrower than that of the second channel waveguide group 106.

In this embodiment, the optical filter 121 (interference membrane filter 121) arranged in the arrayed waveguide grating 1 is arranged such that an angle between the optical filter 121 and the slab central axis 131 in the first slab waveguide 103 and an angle between the slab central axis 132 and the optical filter 121 are the same. Similarly, the optical filter 122 (interference membrane filter 122) is arranged such that an angle between the optical filter 122 and the slab central axis 133 in the second slab waveguide 107 and an angle between the slab central axis 134 and the optical filter 122 are equal.

Regarding two signal lights of different wavelength bands (hereinafter, referred to as wavelength bands A and B), the optical filters (interference membrane filters) 121 and 122 reflect the light of the wavelength band A and transmit the light of the wavelength band B.

Figure 2:
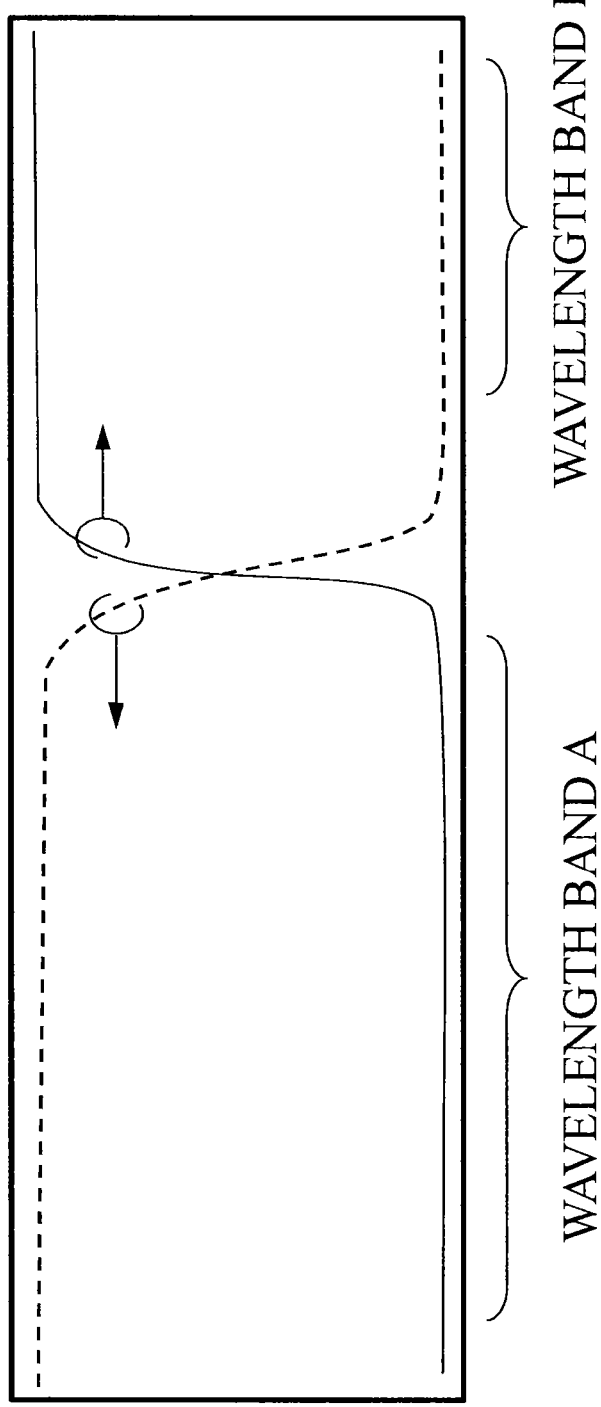
FIG. 2 is a schematic diagram of an example of a characteristic of an optical filter (interference membrane filter).

FIG. 2 is a schematic diagram of an example of a characteristic of the optical filters (interference membrane filters 121 and 122). In FIG. 2, in the wavelength band A in a solid line, a relationship between the wavelength band and transmissivity from a point (1) to a point (3) in FIG. 3 to be described later is illustrated, and in the wavelength band B in a wavy line, a relationship between the wavelength band and the transmissivity from the point (1) to a point (2) in FIG. 3 is illustrated.

Figure 3:
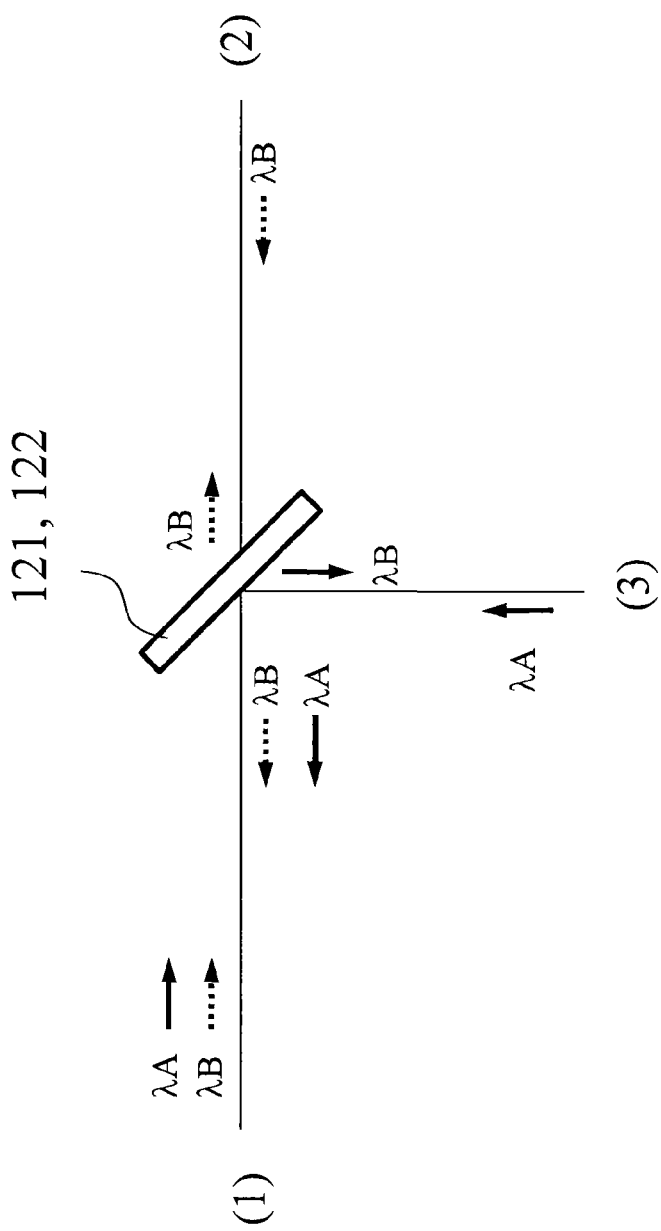
FIG. 3 is a schematic diagram of an example of wavelength multiplexing/demultiplexing of the optical filter (interference membrane filter).

FIG. 3 is a schematic diagram of an example of wavelength multiplexing/demultiplexing of the optical filters (interference membrane filters 121 and 122) the characteristic of which is illustrated in FIG. 2. As illustrated in FIG. 3, the signal light of $\lambda_A$ (wavelength band A) incident from the point (1) is reflected by the optical filters 121 and 122 to travel to the point (3). On the other hand, the signal light of $\lambda_B$ (wavelength band B) incident from the point (1) passes through the optical filters 121 and 122 to travel to the point (2); similarly, the signal light of $\lambda_B$ incident from the point (2) passes through the optical filter to travel to the point (1) and the signal light of $\lambda_A$ incident from the point (3) is reflected by the optical filter to travel to the point (1).

Hereinafter, an operating principle of wavelength distribution to transmit the signal light of the wavelength band A with a broad wavelength interval (wavelength interval X) and the signal light of the wavelength band B with a narrow wavelength interval (wavelength interval Y) bi-directionally over a single fiber by using the optical filters (interference membrane filters) 121 and 122 having the characteristic illustrated in FIG. 2 capable of performing the wavelength multiplexing/demultiplexing illustrated in FIG. 3 for the two beams of signal light of the different wavelength bands as the optical filters is described with reference to FIGS. 4 and 5. Herein, X>Y is satisfied.

Figure 4:
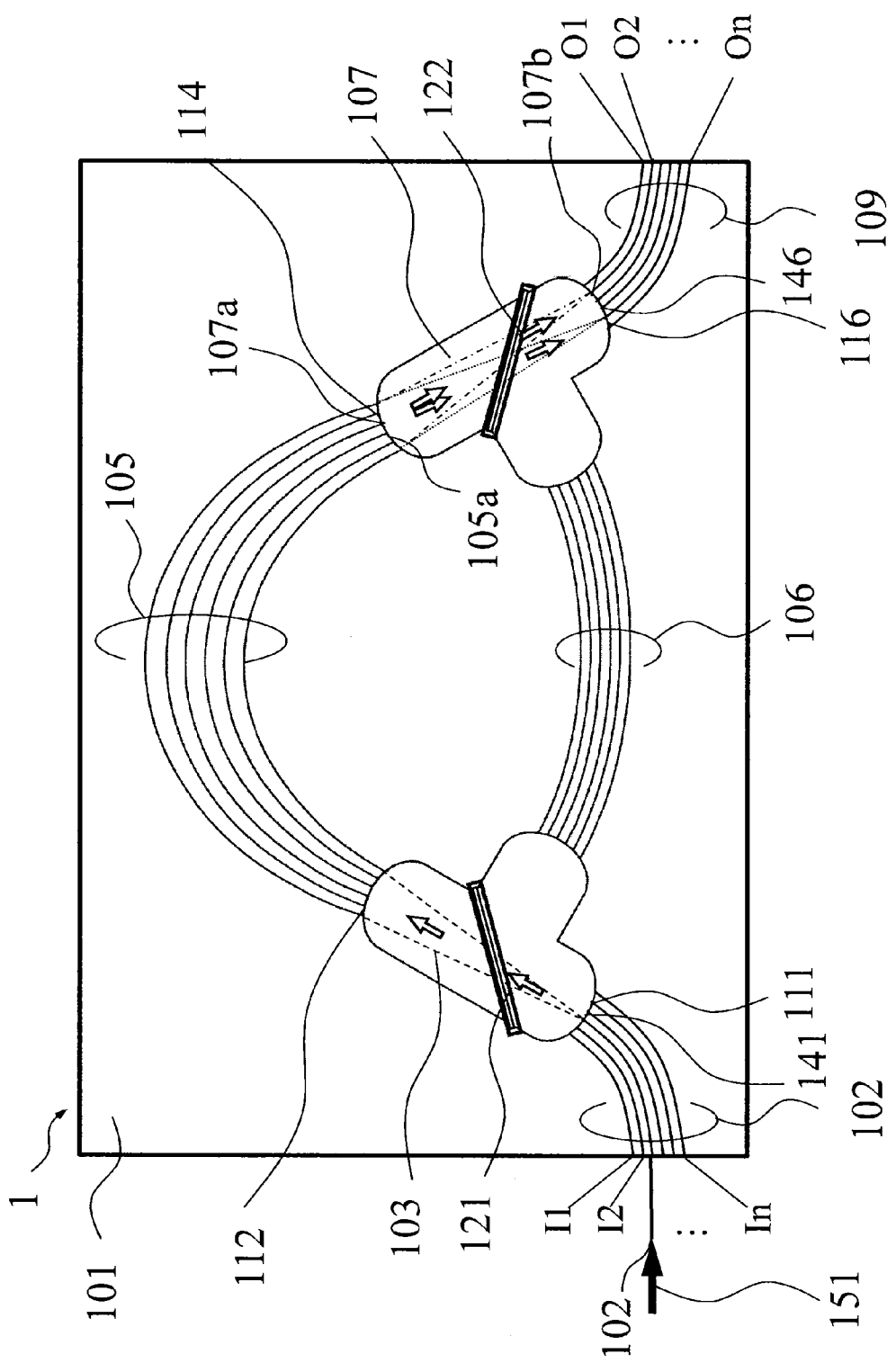
FIG. 4 is an illustrative diagram for illustrating an operating principle of the arrayed waveguide grating illustrated in FIG. 1.
Figure 5:
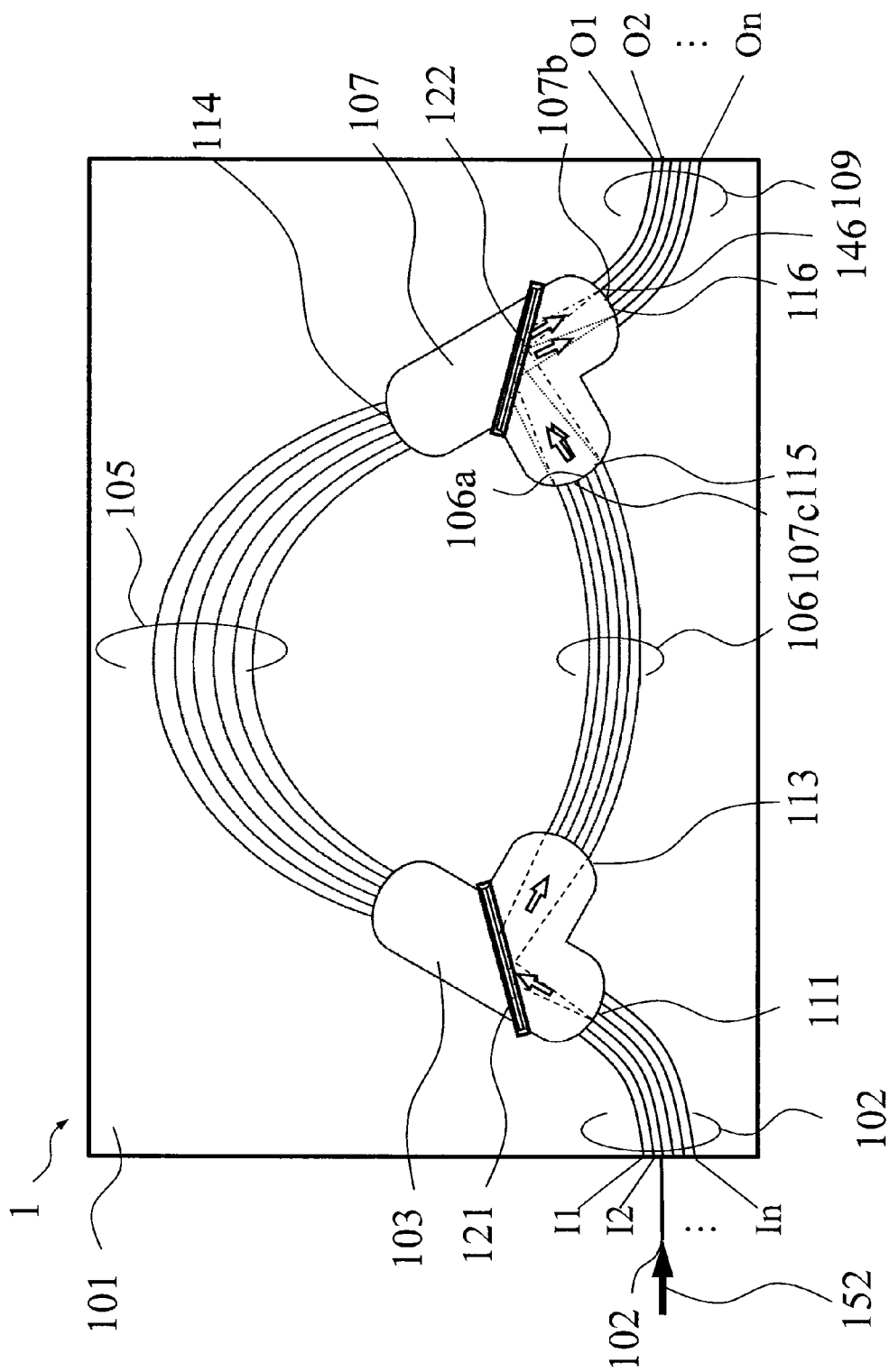
FIG. 5 is an illustrative diagram for illustrating the operating principle of the arrayed waveguide grating illustrated in FIG. 1.

FIGS. 4 and 5 are illustrative diagrams for illustrating the operating principle of the arrayed waveguide grating 1 illustrated in FIG. 1. FIG. 4 illustrates an aspect in which signal light 151 of the wavelength band B with the narrow wavelength interval is input from one of the waveguide of the first input/output waveguide 102 to be distributed to each waveguide of the second input/output waveguide 109 according to the wavelength.

In FIG. 4, the signal light 151 of the wavelength band B (wavelength $\lambda_{bx}$) is input from the first input/output waveguide 102 to the first slab waveguide 103 to propagate through the first slab waveguide 103. Herein, the optical filter 121 transmits the light of the wavelength band B as illustrated in FIG. 2, so that the signal light 151 further propagates through the first slab waveguide 103 while enlarging a spot size thereof. At that time, the connection 112 between the first slab waveguide 103 and an input port of the first channel waveguide group 105 is a surface formed into a circular arc shape with the center of curvature 141 in the connection 111 between the first input/output waveguide 102 and the first slab waveguide 103, so that the signal light 151 is incident on the first channel waveguide group 105 in the same phase to be distributed to each of the channel waveguides forming the first channel waveguide group 105.

The channel waveguides forming the first channel waveguide group 105 have different lengths as described above, so that the signal light with a phase shift is output from each channel waveguide at an output port of the first channel waveguide group 105. When the waveguide path length difference of the first channel waveguide group 105 is set to $\Delta L$, a phase difference $\phi$ between adjacent channel waveguides is represented by equation (1) and it is understood that this depends on the wavelength of the signal light. Meanwhile, in equation (1), $\lambda$ represents the wavelength of the signal light and n represents an effective refractive index of the channel waveguide.

$$\phi = 2\pi n \Delta L / \lambda \quad (1)$$

When such equation (1) is differentiated by the wavelength $\lambda$, following equation (2) can be obtained. It is understood that wavelength dependency $\delta\phi$ of the phase difference is proportional to wavelength change $\delta\lambda$ from such equation (2).

$$\Delta\phi = -2\pi n \Delta L \delta\lambda / \lambda^2 \quad (2)$$

Next, the signal light 151 subjected to phase change by the first channel waveguide group 105 is output from the connection port 114 of the first channel waveguide group 105 to the second slab waveguide 107. At that time, there is the phase difference between the channel waveguides, so that an equiphase surface is inclined with respect to an end face 107a of the second slab waveguide 107. Since the phase difference $\phi$ has the wavelength dependency, the inclination of the equiphase surface also has the wavelength dependency. When an interval on a circular arc between the channel waveguides forming the first channel waveguide group 105 is set to s, inclination 60 of the phase surface between the wavelengths ($\delta\lambda$) is represented by following equation (3) from equation (2).

$$\delta\theta = -\tan^{-1}\{\Delta L \delta\lambda / (s\lambda)\} \quad (3)$$

Therefore, the signal light 151 (wavelengths $\lambda_{b1}$ to $\lambda_{bn}$) of the wavelength band B with the wavelength interval $\delta\lambda$ is propagated in directions different by an angular interval $\delta\theta$. In this case, the optical filter 122 is transparent to the light of the wavelength band B, so that the signal light of the wavelength band B passes through the optical filter 122. Further, an end face 105a of the first channel waveguide group 105 is in the circular arc shape and the center of curvature 146 thereof is on an end face 107b of the slab waveguide 107, so that wavelength-multiplexed light $\lambda_{b1}$ to $\lambda_{bn}$ is concentrated on the end face 107b of the second slab waveguide 107 to be output from the second input/output waveguide 109 respectively.

FIG. 5, as similar as FIG. 4, is the illustrative diagram for illustrating the operating principle of the arrayed waveguide grating 1 illustrated in FIG. 1. FIG. 5 illustrates an aspect in which signal light 152 of the wavelength band A with the broad wavelength interval is input from one waveguide of the input/output waveguide 102 to be distributed to each waveguide of the second input/output waveguide 109 according to the wavelength.

In FIG. 5, the signal light 152 of the wavelength band A (wavelength $\lambda_{ax}$) is input from the first input/output waveguide 102 to the first slab waveguide 103 and propagates through the first slab waveguide 103. Herein, the optical filter 121 reflects the light of the wavelength band A, so that the signal light 152 is reflected at the same angle as an incident angle and propagates in a direction of the connection 113 between the first slab waveguide 103 and the second channel waveguide group 106. At that time, the first slab waveguide 103 has no confinement in a direction parallel to a plane of the substrate 101, so that a spot size of the signal light 152 is enlarged with the propagation, and the signal light 152 is distributed in a vertically inverted manner at the connection 113 between the first slab waveguide 103 and an input port of the second channel waveguide group 106 by the reflection by the optical filter 121. At that time, the connection 113 between the first slab waveguide 103 and the input port of the second channel waveguide group 106 is formed into a circular arc shape with the center of curvature 141 on a virtual image of the connection 111 between the input/output waveguide 102 and the first slab waveguide 103 on the optical filter 121 as a mirror surface when seen from a side of the connection 113, so that the signal light 152 is incident on the second channel waveguide group 106 in the same phase to be distributed to the channel waveguides.

Since the channel waveguides forming the second channel waveguide group 106 have different lengths, the signal light with a phase shift is output from each channel waveguide at an output port of the second channel waveguide group 106. When the waveguide path length difference of the second channel waveguide group 106 is set to ΔL', the phase difference φ between adjacent channel waveguides is represented by equation (1) described above and it is understood that this depends on the wavelength of the signal light. When equation (1) is differentiated by a wavelength λ', equation (2) described above is obtained and it is understood that the wavelength dependency δφ of the phase difference is proportional to wavelength change δλ'.

The signal light 152 subjected to the phase change by the second channel waveguide group 106 is output from the connection 115 of the second channel waveguide group 106 to the second slab waveguide 107. At that time, there is the phase difference between the channel waveguides, so that an equiphase surface is inclined with respect to an end face 107c of the second slab waveguide 107. Since the phase difference φ has the wavelength dependency, the inclination of the equiphase surface also has the wavelength dependency. When an interval on a circular arc between the channel waveguides forming the second channel waveguide group 106 is set to s, the inclination δθ of the phase surface between the wavelengths (δλ') is represented by following equation (3) described above from equation (2) described above.

Therefore, the signal light 152 (wavelengths $\lambda_{a1}$ to $\lambda_{an}$) of the wavelength band A with the wavelength interval δλ' is propagated in directions different by an angular interval δθ. At that time, the optical filter 122 reflects the light of the wavelength band A, so that the signal light of the wavelength band B is reflected by the optical filter 122 to travel in a direction of the end face 107b of the second slab waveguide 107 in a vertically inverted manner. Further, the end face 106a of the second channel waveguide group 106 is in the circular arc shape and the center of curvature 146 of the end face 106a is on a virtual image of the end face 107b of the second slab waveguide 107 on the optical filter 122 as a mirror surface as seen from a side of the end face 106a, so that wavelength-multiplexed light $\lambda_{a1}$ to $\lambda_{an}$ is concentrated on the end face 107b of the second slab waveguide 107 to be output from the second input/output waveguide 109.

An example of a wavelength distribution characteristic when the signal light of each wavelength $\lambda_{b1}$ to $\lambda_{bn}$ incident from each port $I_1$ to $I_n$ of the first input/output waveguide 102 is wavelength-distributed to be output to each port $O_1$ to $O_n$ of the second input/output waveguide 109 as illustrated in FIG. 4 on the above-described operating principle is illustrated in FIG. 23(b) and an example of the wavelength distribution characteristic when the signal light of each wavelength $\lambda_{a1}$ to $\lambda_{an}$ incident from each port $I_1$ to $I_n$ of the input/output waveguide 102 is wavelength-distributed to be output to each port $O_1$ to $O_n$ of the second input/output waveguide 109 as illustrated in FIG. 5 is illustrated in FIG. 23(a).

Meanwhile, in the above-described examples in FIGS. 4 and 5, a case in which the signal light is incident from a side of the first input/output waveguide 102 and the signal light is emitted from a side of the second input/output waveguide 109 is described; however, the same applies to a case in which the signal light is incident from the side of the second input/output waveguide 109 and the signal light is emitted from the side of the first input/output waveguide 102.

Next, an example of a method of designing the arrayed waveguide grating 1 according to this embodiment is described. Meanwhile, in the following description, a case in which the wavelength band A is set to a 1.3 μm band with the wavelength interval of 20 nm and the wavelength band B is set to a 1.5 band with a frequency interval of 100 GHz is described as a matter of convenience. It is described by setting the arrayed waveguide grating 1 for the broad wavelength interval to AWG1 and the arrayed waveguide grating 1 for the narrow wavelength interval to AWG2.

Figure 6:
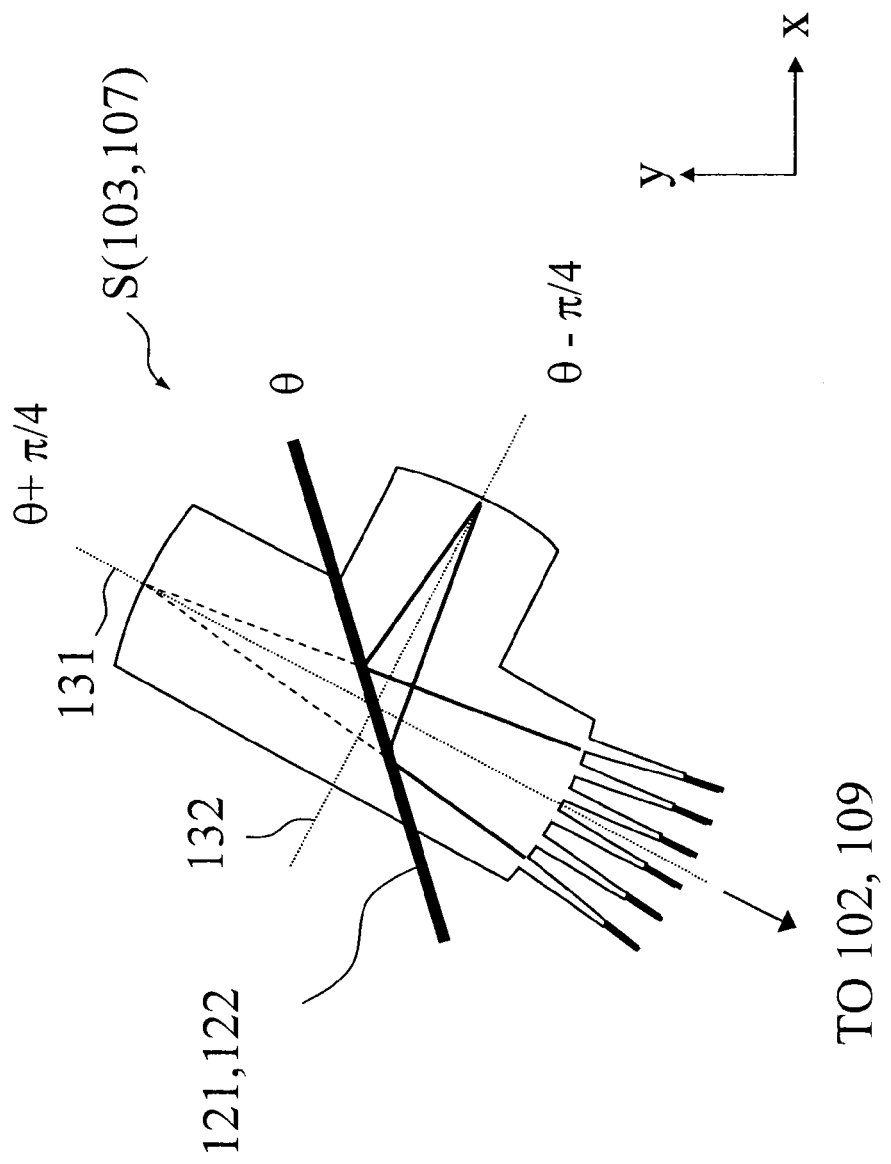
FIG. 6 is a schematic diagram of an example of a structure of a slab waveguide forming the arrayed waveguide grating of the first embodiment.

FIG. 6 is a schematic diagram of an example of a structure of the slab waveguide (the first slab waveguide 103 and the second slab waveguide 107; sometimes generally referred to as "slab waveguide S" in following description) forming the arrayed waveguide grating 1 of the first embodiment. In order to distribute the signal light of the two wavelength bands which are the wavelength bands A and B bi-directionally over a single fiber in the slab waveguide S, the same input/output waveguide is preferably used for the wavelength bands A and B as the first input/output waveguide 102 and the second input/output waveguide 109 (refer to FIG. 1).

In the first slab waveguide 103 and the second slab waveguide 107, in order to distribute the signal light of the two wavelength bands which are the wavelength bands A and B bi-directionally over a single fiber, in the first slab waveguide 103, a slab length a being a length of an axis (slab central axis 131) connecting the center of curvature 141 on the connection 111 part between the first input/output waveguide 102 and the first slab waveguide 103 and the center of curvature 142 on the connection 112 between the first channel wave group 105 and the first slab waveguide 103 is preferably made equal to a slab length b which is a sum of a length on the slab central axis 131 from the center of curvature 141 on the connection 111 between the first input/output waveguide 102 and the first slab waveguide 103 to the optical filter 121 arranged in the first slab waveguide 103 and a length on the slab central axis 132 from the center of curvature 143 on the connection 113 between the second channel waveguide group 106 and the first slab waveguide 103 to the optical filter 121 arranged in the first slab waveguide 103.

Similarly, in the second slab waveguide 107, a slab length c being a length of an axis connecting the center of curvature 146 on the connection 116 between the second input/output waveguide 109 and the second slab waveguide 107 and the center of curvature 144 on the connection 114 between the first channel waveguide 105 and the second slab waveguide 107 is preferably made equal to a slab length d which is a sum of a length on the slab central axis 133 from the center of curvature 146 on the connection 116 between the second input/output waveguide 109 and the second slab waveguide 107 to the optical filter 122 arranged in the second slab waveguide 107 and a length on the slab central axis 134 from the center of curvature 145 on the connection 115 between the second channel waveguide group 106 and the second slab waveguide 107 to the optical filter 122 arranged in the second slab waveguide 107. When at least either of, and the most preferably both of, the slab lengths a and b and the slab lengths c and d are made equal to each other, a distance the signal light of the wavelength band A passing through the optical filters (interference membrane filters) 121 and 122 arranged in the slab waveguide S (the first slab waveguide 103 and the second slab waveguide 107) propagates through the slab waveguide S and a distance the signal light of the wavelength band B reflected by the optical filters (interference membrane filters) 121 and 122 propagates through the slab waveguide S are equal to each other.

Further, in order to distribute the signal light of the two wavelength bands which are the wavelength bands A and B bi-directionally over a single fiber in the first slab waveguide 103 and the second slab waveguide 107, the slab central axes 131 and 132 (refer to FIG. 1) in the first slab waveguide 103 are preferably orthogonal to each other. The slab central axes 133 and 134 (refer to FIG. 1) in the second slab waveguide 107 are preferably orthogonal to each other and it is the most preferably that it is formed such that both of the slab central axes 131 and 132 and the slab central axes 133 and 134 are orthogonal to each other.

The slab waveguide S illustrated in FIG. 6 is formed such that the slab lengths along which the signal lights of the wavelength bands A and B are propagated are equal to each other, and that the slab central axis 131 is at an angle of θ+π/4 (rad.) and the slab central axis 132 is at an angle of θ−π/4 (rad.) when an insertion angle of the optical filters 121 and 122 arranged in the slab waveguide S with respect to a horizontal direction (x axis direction in FIG. 6) is set to θ, for example. Meanwhile, in FIG. 6, the slab central axes 131 and 132 in a case of the first slab waveguide 103 as the slab waveguide are described as an example, the same applies to the second slab waveguide 107 in which the slab central axes 131 and 132 are replaced by the slab central axes 133 and 134, respectively.

At least one of an angle between the two slab central axes formed in the first slab waveguide 103 on a side interposed between the channel waveguide groups 105 and 106 and an angle between the two slab central axes formed in the second slab waveguide 107 on a side interposed between the channel waveguide groups 105 and 106 may be smaller than 90 degrees. For example, in FIG. 6, the slab central axis 131 may be formed at an angle of θ+α (rad.) and the slab central axis 132 may be formed at an angle of θ−α (rad.). α<π/4 is satisfied. Since α is smaller than π/4, it is possible to arrange the channel waveguides groups so as to be close to each other, so that a miniaturized arrayed waveguide grating can be realized. Herein, the slab central axes 131 and 132 in a case of the first slab waveguide 103 as the slab waveguide are described as an example, the same applies to the second slab waveguide 107 in which the slab central axes 131 and 132 are replaced by the slab central axes 133 and 134, respectively.

The method of designing the arrayed waveguide grating 1 is hereinafter more specifically described with reference to equations. In general, a slab length $L_f$ of the arrayed waveguide grating 1 is given by equation (4). Meanwhile, variables in equation (4) are defined in FIG. 25.

$$L_f = (N_{ch} \cdot n_s \cdot d \cdot D)/\lambda_c \qquad (4)$$

Figure 7:
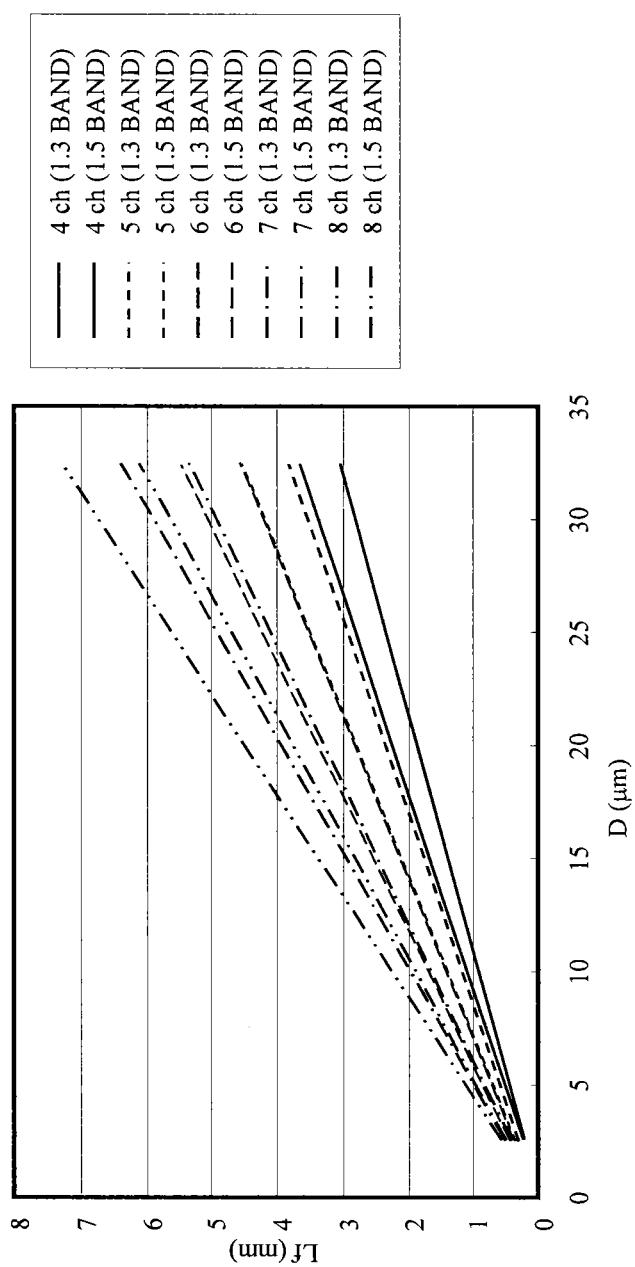
FIG. 7 is a view of a relationship between an array pitch d and a slab length $L_f$.

A relationship between an array pitch d and the slab length $L_f$ of AWG1 and AWG2 when the number of wavelengths $N_{ch}$ and the array pitch d are changed supposing that AWG1 and AWG2 are independent separate arrayed waveguide gratings 1 is illustrated in FIG. 7 (Meanwhile, in FIG. 7, "1.3 band" and "1.5 band" represent the 1.3 µm band and 1.5 µm band, respectively. Hereinafter, the same applies to FIGS. 8 to 11. In FIG. 7, regarding the same type of lines, one with a longer slab length $L_f$ indicates the 1.3 µm band and one with a shorter slab length $L_f$ indicates the 1.5 µm band.) As illustrated in FIG. 7, it is understood that $N_{ch}$ and d of AWG2 should be made larger than those of AWG1 for obtaining the same slab length $L_f$.

If the slab length $L_f$ and an input/output pitch D of AWG1 (1.3 µm band) and those of AWG2 (1.5 µm band) are made equal for commonalizing, a conditional equation as equation (5) may be obtained by using equation (4). It is possible to determine the number of wavelengths $N_{ch}$, a slab refractive index $n_s$, the array pitch d, and a central wavelength $\lambda_c$ such that such equation (5) is satisfied.

$$(N_{ch,1} \cdot n_{s,1} \cdot d_1)/\lambda_{c,1} = (N_{ch,2} \cdot n_{s,2} \cdot d_2)/\lambda_{c,2} \qquad (5)$$

Figure 8:
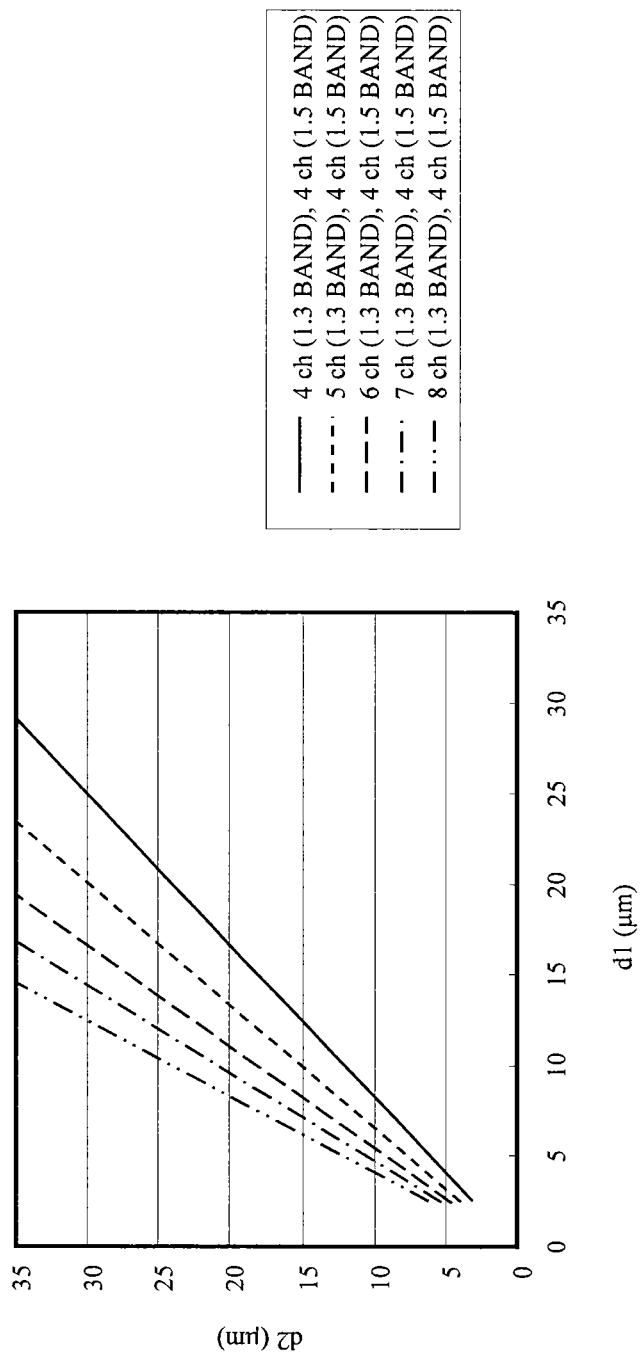
FIG. 8 is a view of a relationship between $d_1$ and $d_2$ when $N_{ch}$ of AWG1 is altered.
Figure 9:
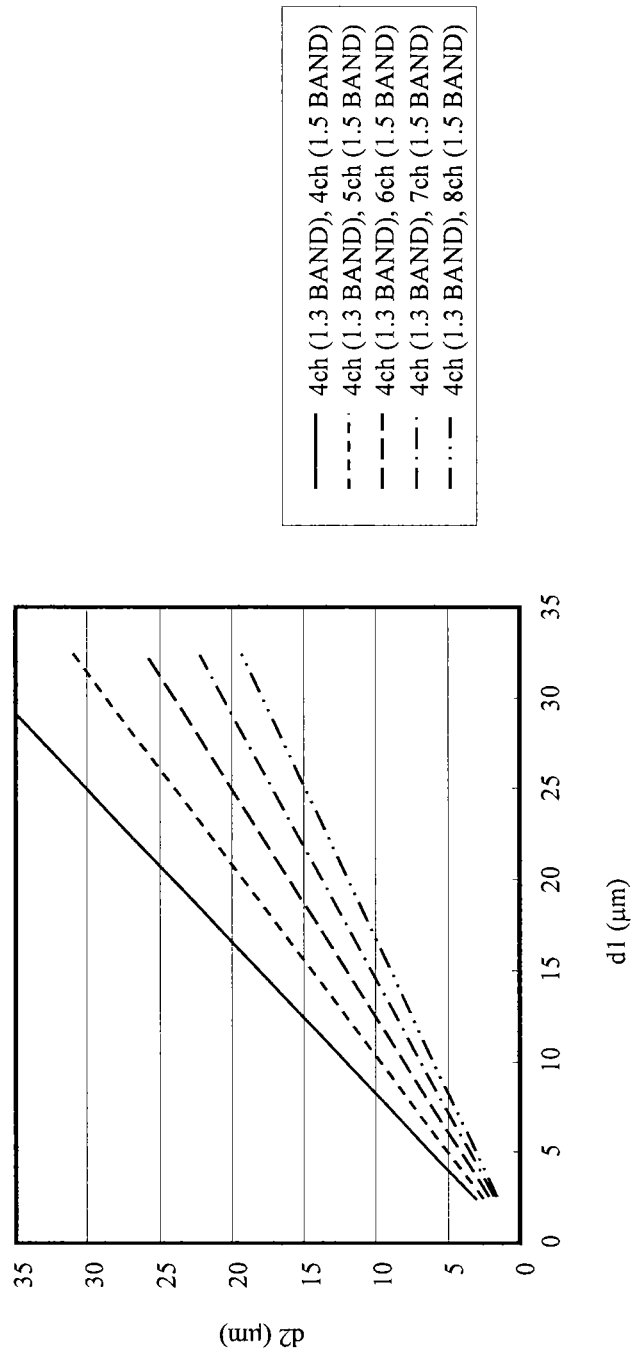
FIG. 9 is a view of a relationship between $d_1$ and $d_2$ when $N_{ch}$ of AWG2 is altered.

A relationship between an array pitch $d_1$ of AWG1 and an array pitch $d_2$ of AWG2 when $\lambda_c$ and $n_s$ are made constant and $N_{ch}$ is changed is illustrated in FIGS. 8 and 9 as a specific design example. Meanwhile, FIG. 8 is a view of the relationship between $d_1$ and $d_2$ when $N_{ch}$ of AWG1 is changed and FIG. 9 is a view of the relationship between $d_1$ and $d_2$ when $N_{ch}$ of AWG2 is changed.

Further, when it is wanted to realize a wavelength distributor provided with N×N input/output ports ($N_{ch1} = N_{ch2}$) by making the numbers of wavelengths of AWG1 and AWG2 equal to each other, equation (5) is deformed as equation (6).

$$(n_{s,1} \cdot d_1)/\lambda_{c,1} = (n_{s,2} \cdot d_2)/\lambda_{c,2} \qquad (6)$$

Figure 10:
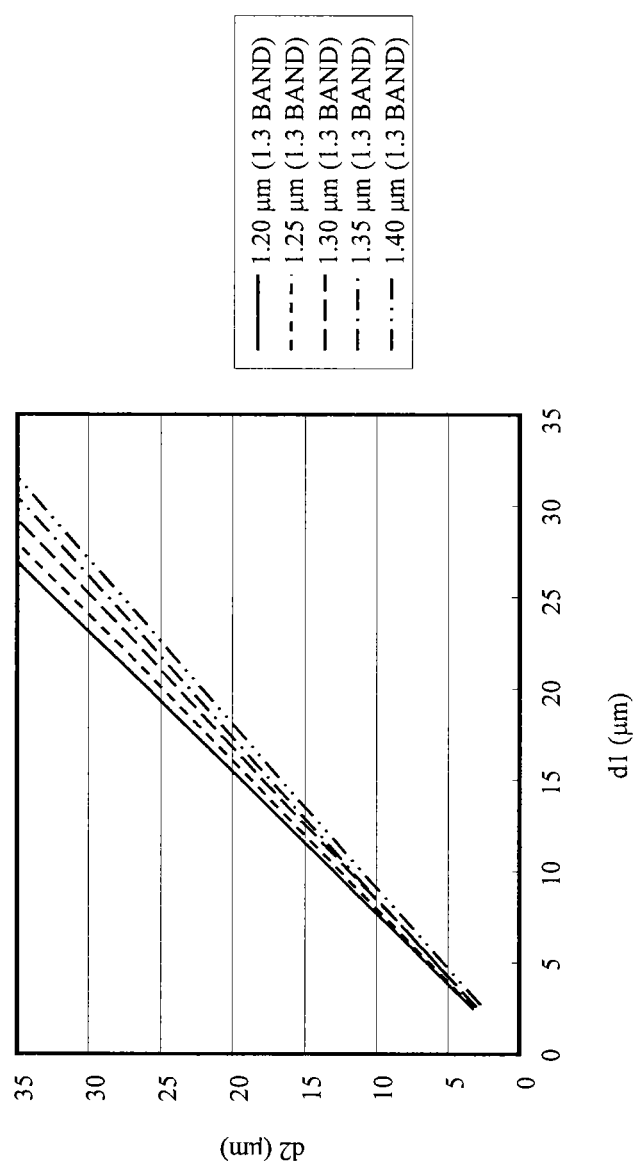
FIG. 10 is a view of a relationship between the array pitch $d_1$ of AWG1 and the array pitch $d_2$ of AWG2 when a central wavelength $\lambda_{c1}$ of AWG1 is altered.
Figure 11:
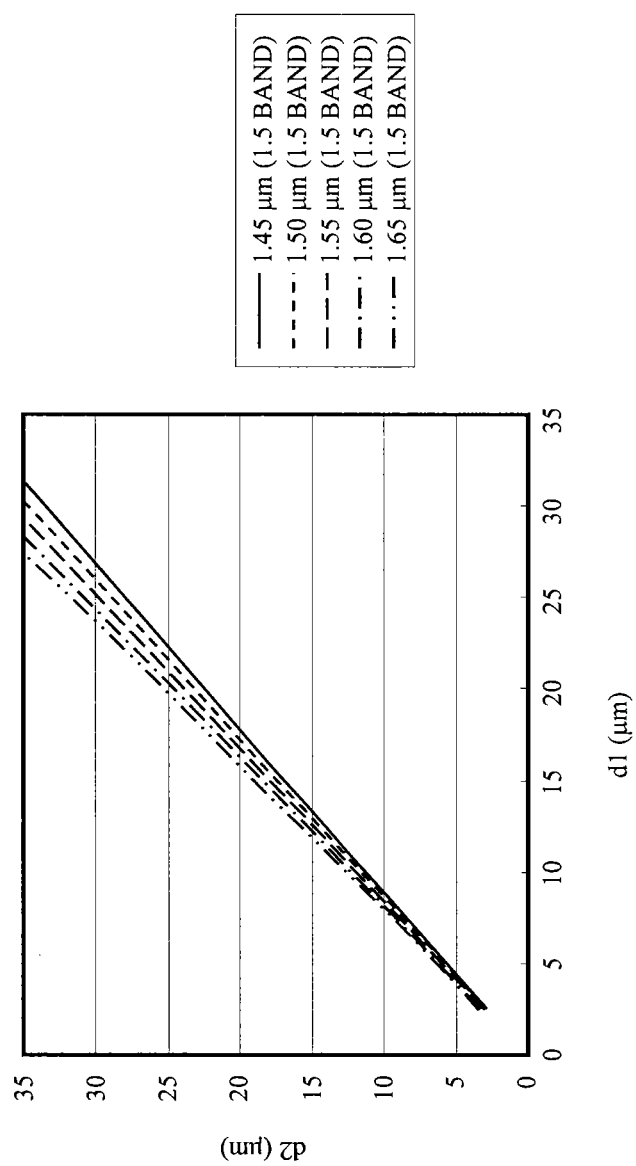
FIG. 11 is a view of the relationship between the array pitch $d_1$ of AWG1 and the array pitch $d_2$ of AWG2 when a central wavelength $\lambda_{c2}$ of AWG2 is altered.

The relationship between the array pitch $d_1$ of AWG1 and the array pitch $d_2$ of AWG2 when the central wavelength $\lambda_{c2}$ of AWG2 is made constant and the central wavelength $\lambda_{c1}$ of AWG1 is changed such that such equation (6) is satisfied is illustrated in FIG. 10. Similarly, the relationship between the array pitch $d_1$ of AWG1 and the array pitch $d_2$ of AWG2 when the central wavelength $\lambda_{c1}$ of AWG1 is made constant and the central wavelength $\lambda_{c2}$ of AWG2 is changed is illustrated in FIG. 11.

In this manner, it is possible to realize the arrayed waveguide grating 1 an input/output unit of which is integrated by setting a parameter such that the relationship in equation (5) is satisfied. Further, it is possible to realize the wavelength distributor with N ports×N ports satisfying the wavelength distribution characteristic illustrated in FIGS. 23(a) and 23(b) by setting the parameter such that a relationship in equation (6) is satisfied.

In any of the first slab waveguide 103 and the second slab waveguide 107 in which the optical filters 121 and 122 are arranged, respectively, the central axis on a side of the first input/output waveguide 102 or the central axis on a side of the second input/output waveguide 109 is desirably shifted from the central axis on a side of the channel waveguide group 105 by an amount of a shift of an optical path generated by passage through the optical filters 121 and 122 of the light passing through the optical filters 121 and 122. The shift of the optical path is intended to mean a gap between the center of the optical path when the optical filters 121 and 122 are not arranged and the first slab waveguide 103 or the second slab waveguide 107 is formed of a homogenous medium and the center of the optical path when the optical filters 121 and 122 are arranged.

Figure 26:
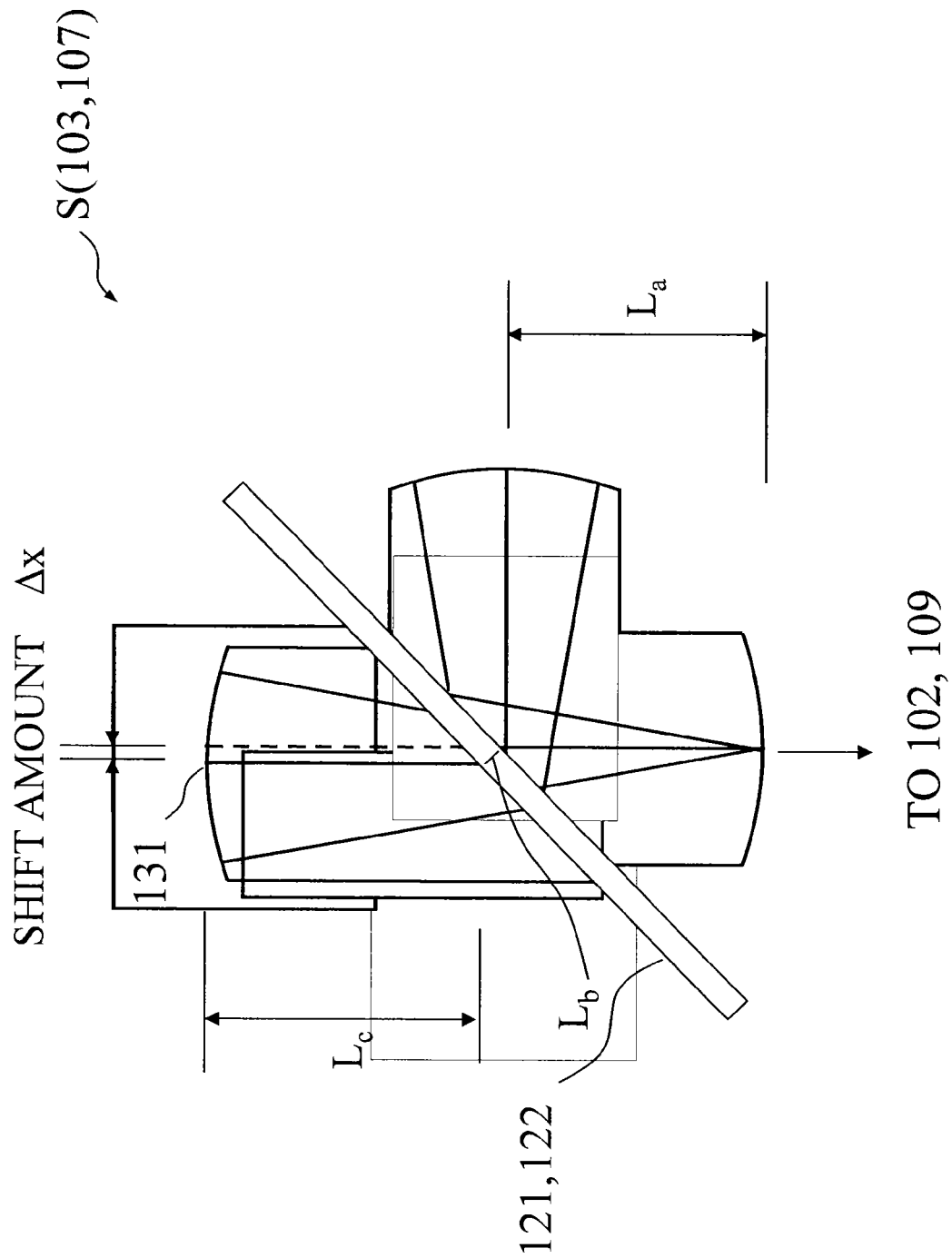
FIG. 26 is a schematic diagram of another aspect of the arrayed waveguide grating according to the first embodiment.

In the slab waveguide S (103, 107) illustrated in FIG. 26, there is a shift of the central axis by a shift amount of Δx between the side of the first input/output waveguide 102 or the side of the second input/output waveguide 109 and the side of the channel waveguide group 105. When the center of the optical path and the central axis conform to each other, the light is evenly distributed to all the channel waveguides or the light is evenly distributed from all the channel waveguides, so that it becomes possible to reduce a loss of the arrayed waveguide grating.

Figure 27:
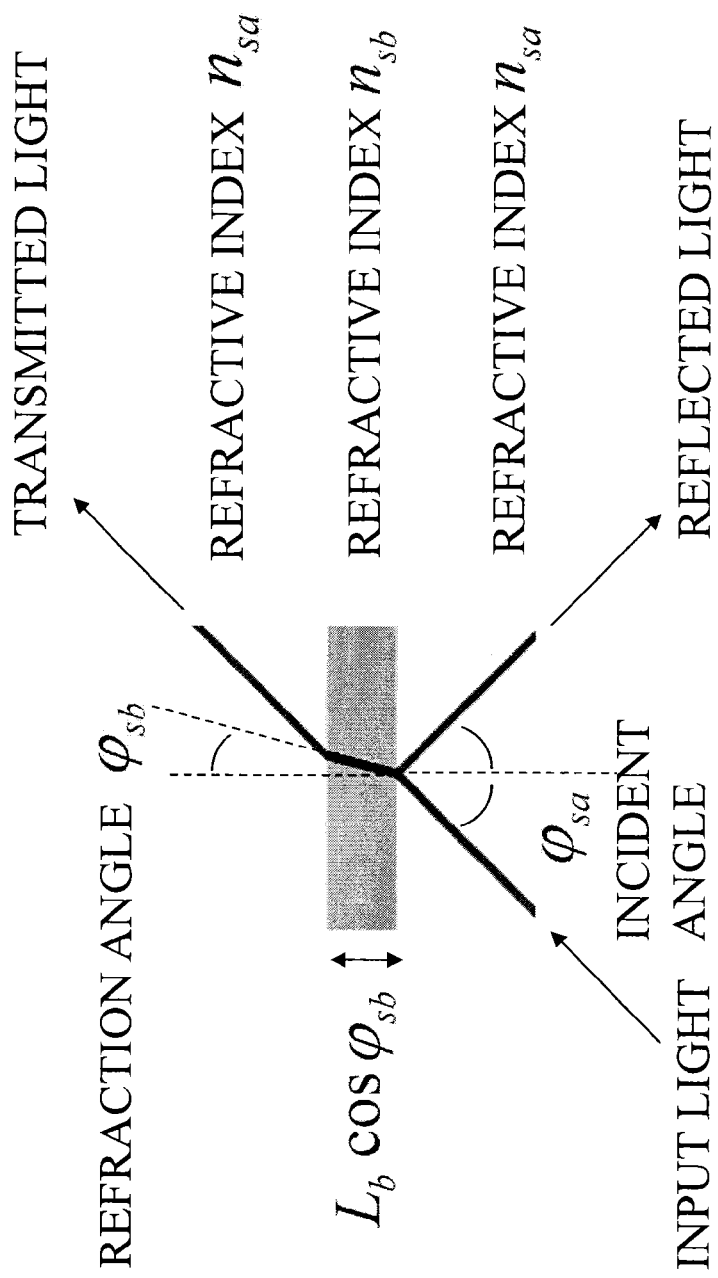
FIG. 27 is a schematic diagram of an example in which light passes through an optical filter 121 of a slab waveguide forming the arrayed waveguide grating of the first embodiment.

The shift amount of the central axis is described. An example in which the light from the first input/output waveguide 102 passes through the optical filter 121 in the first slab waveguide 103 is illustrated in FIG. 27. A refractive index of the first slab waveguide 103 is set to $n_{sa}$ and an average refractive index of the optical filter 121 is set to $n_{sb}$. The input light is incident on the optical filter 121 at an incident angle of $\phi_{sa}$, refracted on an interface between the first slab waveguide 103 and the optical filter 121 and an interface between the optical filter 121 and the first slab waveguide 103 to travel through the first slab waveguide 103 at an emission angle of $\phi_{sa}$. At that time, the light in the optical filter 121 has a refraction angle of $\phi_{sb}$. When an optical path length in the optical filter 121 is set to $L_b$, the optical path length of the optical filter 121 is represented as $L_b \cdot \cos \phi_{sb}$. The shift amount $\Delta x$ between the central axis on the side of the first input/output waveguide 102 and the central axis on the side of the channel waveguide group 105 is represented as follows.

$$\Delta x = L_b \cdot \sin(\phi_{sa} - \phi_{sb}) \quad (7)$$

Herein, $\phi_{sa}$ and $\phi_{sb}$ have a following relationship of Snell's law.

$$n_{sa} \cdot \sin \phi_{sa} = n_{sb} \cdot \sin \phi_{sb} \quad (8)$$

The relationship of the slab lengths in FIG. 26 is represented as follows. The slab length $L_f$ is represented by a following equation when an optical path length in the slab of the central axis on the side of the first input/output waveguide 102 is set to $L_a$, the optical path length in the optical filter 121 is set to $L_b$, and the optical path length in the slab of the central axis on the side of the channel waveguide group 105 is set to $L_c$.

$$L_f = L_a + (n_{sb}/n_{sa})L_b + L_c \quad (9)$$

Meanwhile, the parameter herein described is an example of the present invention and this might change depending on the wavelength band (frequency band) to be used, the wavelength interval (frequency interval), the number of wavelengths, a material of the waveguide, a type of a multilayer membrane filter and the like.

Since the arrayed waveguide grating 1 according to the first embodiment of the present invention described above has a configuration in which the optical filters (interference membrane filters) 121 and 122 are arranged in the first slab waveguide 103 and the second slab waveguide 107 formed on the substrate, this may wavelength-distribute the wavelength-multiplexed signal light of the different wavelength bands with the different wavelength intervals (for example, the signal light 151 of the wavelength band A with the broad wavelength interval and the signal light 152 of the wavelength band B with the narrow wavelength interval) bi-directionally over a single fiber in a single planar lightwave circuit, so that a miniaturized both-side input/output waveguide integrated arrayed waveguide grating 1 is realized at a low cost.

Second Embodiment

A second embodiment of the present invention is hereinafter described in detail with reference to the attached drawings. Meanwhile, in the following description, the same reference sign is assigned to the similar structure and the same member as those of the above-described first embodiment and detailed description thereof is omitted or the description is simplified.

Figure 12:
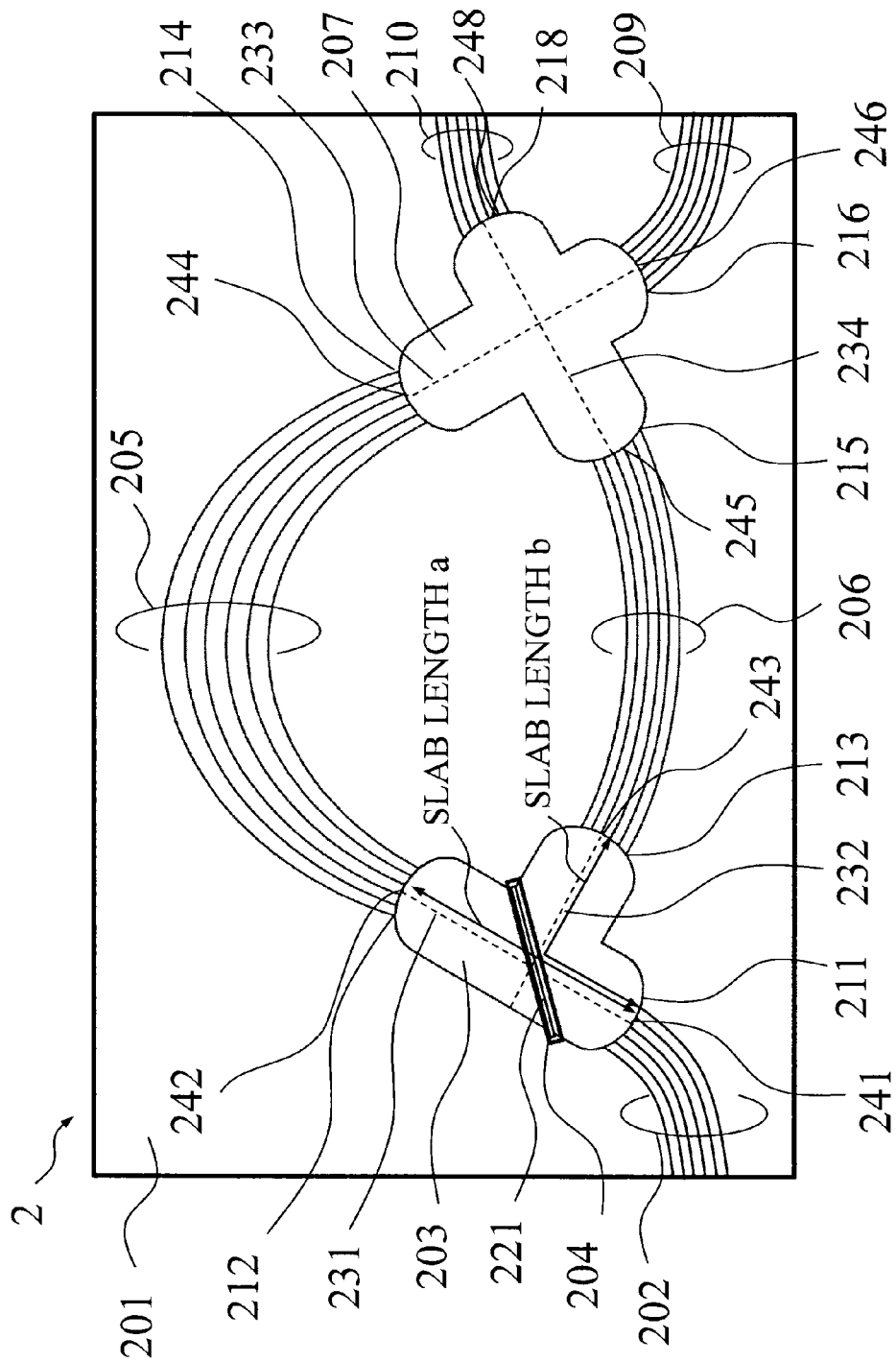
FIG. 12 is a schematic diagram of an arrayed waveguide grating according to a second embodiment of the present invention.

FIG. 12 is a schematic diagram of an aspect of an arrayed waveguide grating 2 according to the second embodiment of the present invention. As illustrated in FIG. 12, the arrayed waveguide grating 2 according to the second embodiment of the present invention is a single-side input/output waveguide integrated arrayed waveguide grating 2 in which a first slab waveguide 203, a second slab waveguide 207, a first input/output waveguide 202 connected to the first slab waveguide 203, two second input/output waveguides 209 and 210 connected to the second slab waveguide 207, a first channel waveguide group 205 with both ends connected to the first slab waveguide 203 and the second slab waveguide 207, and a second channel waveguide group 206 with both ends connected to the first slab waveguide 203 and the second slab waveguide 207 are formed on a substrate 201 formed of a silicon substrate or a glass substrate and the like.

Each of the first channel waveguide group 205 and the second channel waveguide group 206 forming the arrayed waveguide grating 2 is formed of a plurality of channel waveguides having path length sequentially becoming longer by a predetermined path length difference. An interference membrane filter 221 being an optical filter is embedded to be arranged in a slit 204 formed in a part of the first slab waveguide 203 forming the arrayed waveguide grating 2.

Meanwhile, in FIG. 12, a connection part between the first input/output waveguide 202 and the first slab waveguide 203 is a connection 211, a connection part between the second input/output waveguide 209 and the second slab waveguide 207 is a connection 216, a connection part between the second input/output waveguide 210 and the second slab waveguide 207 is a connection 218, a connection part between the first slab waveguide 203 and the first channel waveguide group 205 is a connection 212, a connection part between the first slab waveguide 203 and the second channel waveguide group 206 is a connection 213, a connection part between the second slab waveguide 207 and the first channel waveguide group 205 is a connection 214, and a connection part between the second slab waveguide 207 and the second channel waveguide group 206 is a connection 215.

Two slab central axes 231 and 232 are formed in the first slab waveguide 203. The one slab central axis 231 is the axis connecting a center of curvature 241 on the connection 211 between the first input/output waveguide 202 and the first slab waveguide 203 and a center of curvature 242 on the connection 212 between the first channel waveguide group 205 and the first slab waveguide 203, and the other slab central axis 232 is the axis connecting a center of curvature 243 on the connection 213 between the second channel waveguide group 206 and the first slab waveguide 203 and an intersection between the above-described one slab central axis 231 and the optical filter 221 arranged in the first slab waveguide 203 (and an elongated axis thereof).

Similarly, two slab central axes 233 and 234 are formed also in the second slab waveguide 207. The one slab central axis 233 is the axis connecting a center of curvature 246 on the connection part 216 between the second input/output waveguide 209 and the second slab waveguide 207 and a center of curvature 244 on the connection 214 between the first channel waveguide group 205 and the second slab waveguide 207, and the other slab central axis 234 is the axis connecting a center of curvature 245 on the connection 215 between the second channel waveguide group 206 and the second slab waveguide 207 and a center of curvature 248 on the connection 218 between the second input/output waveguide 210 and the second slab waveguide 207.

As illustrated in FIG. 12, in the arrayed waveguide grating 2 according to this embodiment, the two channel waveguides (the first channel waveguide group 205 and the second channel waveguide group 206) are formed. The two connections as many as the channel waveguide groups which are the connection part 212 to the first channel waveguide group 205 and the connection part 213 to the second channel waveguide group 206 are formed in the first slab waveguide 203. Similarly, the two connections as many as the channel waveguide groups which are the connection 214 to the first channel waveguide group 205 and the connection 215 to the second channel waveguide group 206 are formed also in the second slab waveguide 207.

As in the first embodiment, the first channel waveguide group 205 forming the arrayed waveguide grating 2 according to this embodiment is formed such that lengths thereof sequentially become longer by a predetermined waveguide path length difference ΔL and the second channel waveguide group 206 is formed such that lengths thereof sequentially become longer by a predetermined waveguide path length difference ΔL'. Herein, in a case in which a relationship between the waveguide path length differences ΔL and ΔL' satisfies ΔL>ΔL' as an example, the first channel waveguide group 205 has a characteristic to transmit signal light with a wavelength interval narrower than that of the second channel waveguide group 206.

In this embodiment, the optical filter 221 (interference membrane filter 221) arranged in the arrayed waveguide grating 2 is arranged such that an angle between the optical filter 221 and the slab central axis 231 in the first slab waveguide 203 and an angle between the slab central axis 232 and the optical filter 221 are equal.

Hereinafter, an operating principle of wavelength distribution to transmit the signal light of a wavelength band A with a broad wavelength interval (wavelength interval X) and the signal light of a wavelength band B with a narrow wavelength interval (wavelength interval Y) bi-directionally over a single fiber by using the optical filter (interference membrane filter) 221 having a characteristic illustrated in FIG. 2 capable of performing wavelength multiplexing/demultiplexing illustrated in FIG. 3 for two beams of signal light of different wavelength bands as the optical filter is described with reference to FIGS. 13 and 14. As similar as in the first embodiment, a relationship of X>Y is satisfied.

Figure 13:
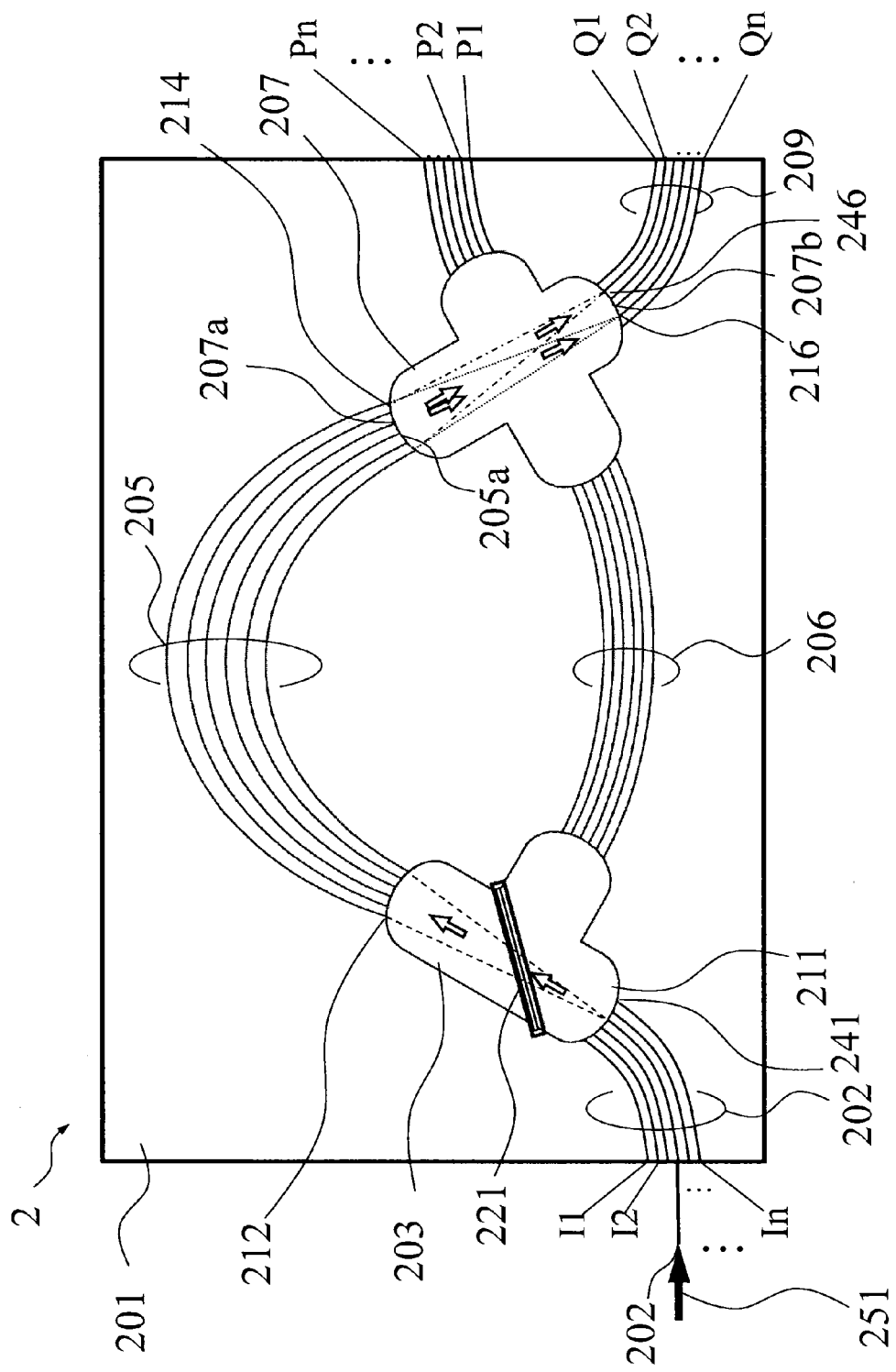
FIG. 13 is an illustrative diagram for illustrating an operating principle of the arrayed waveguide grating illustrated in FIG. 12.
Figure 14:
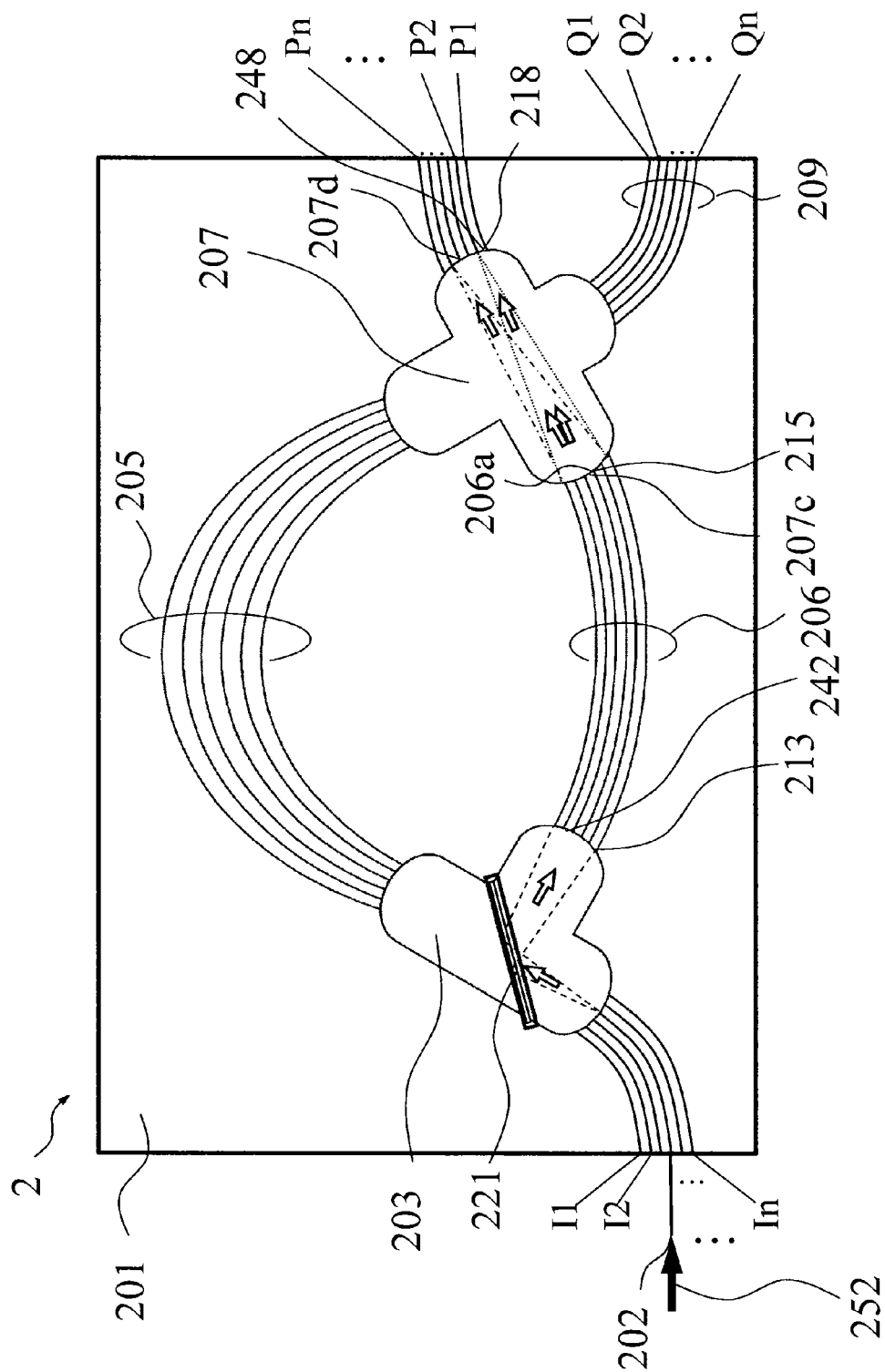
FIG. 14 is an illustrative diagram for illustrating the operating principle of the arrayed waveguide grating illustrated in FIG. 12.

FIGS. 13 and 14 are illustrative diagrams for illustrating the operating principle of the arrayed waveguide grating 2 illustrated in FIG. 12. FIG. 13 illustrates an aspect in which signal light 251 of the wavelength band B with the narrow wavelength interval is input from one of waveguides of the first input/output waveguide 202 to be distributed to each waveguide of the second input/output waveguide 209 according to the wavelength.

In FIG. 13, the signal light 251 (wavelength $\lambda_{bx}$) of the wavelength band B is input from the first input/output waveguide 202 to the first slab waveguide 203 and propagates through the first slab waveguide 203. Herein, the optical filter 221 transmits the light of the wavelength band B as illustrated in FIG. 2, so that the signal light 251 further propagates through the first slab waveguide 203 while enlarging a spot size thereof. At that time, the connection 212 between the first slab waveguide 203 and an input port of the first channel waveguide group 205 is a surface formed into a circular arc shape having the center of curvature 241 on the connection 211 between the first input/output waveguide 202 and the first slab waveguide 203, so that the signal light 251 is incident on the first channel waveguide group 205 in the same phase to be distributed to the channel waveguides forming the first channel waveguide group 205.

Each of the channel waveguides forming the first channel waveguide group 205 have different lengths as described above, so that the signal light with a phase shift is output from each channel waveguide at an output port of the first channel waveguide group 205. When the waveguide path length difference of the first channel waveguide group 205 is set to £L, a phase difference φ between adjacent channel waveguides is represented by equation (1) described above and this depends on the wavelength of the signal light.

When such equation (1) is differentiated by a wavelength λ, equation (2) described above can be obtained. It is understood that wavelength dependency δφ of the phase difference is proportional to wavelength change δλ from such equation (2).

Next, the signal light 251 subjected to phase change by the first channel waveguide group 205 is output from the connection 214 of the first channel waveguide group 205 to the second slab waveguide 207. At that time, there is the phase difference between the channel waveguides, so that an equiphase surface is inclined with respect to an end face 207a of the second slab waveguide 207. Since the phase difference φ has the wavelength dependency, the inclination of the equiphase surface also has the wavelength dependency. When an interval on a circular arc between the channel waveguides forming the first channel waveguide group 205 is set to s, inclination 50 of the phase surface between the wavelengths (δλ) is represented by equation (3) described above from equation (2) and the signal light 251 (wavelengths $\lambda_{b1}$ to $\lambda_{bn}$) of the wavelength band B with the wavelength interval δλ is propagated in different directions by an angular interval 50. An end face 205a of the first channel waveguide group 205 has the circular arc shape and the center of curvature 246 thereof is on an end face 207b of the slab waveguide 207, so that wavelength-multiplexed light $\lambda_{b1}$ to $\lambda_{bn}$ is concentrated on the end face 207b of the second slab waveguide 207 to be output from the second input/output waveguide 209.

FIG. 14, as FIG. 13, is the illustrative diagram for illustrating the operating principle of the arrayed waveguide grating 2 illustrated in FIG. 12. FIG. 14 illustrates an aspect in which signal light 252 of the wavelength band A with the broad wavelength interval is input from one waveguide of the first input/output waveguide 202 to be distributed to each waveguide of the second input/output waveguide 210 according to the wavelength.

In FIG. 14, the signal light 252 (wavelength $\lambda_{ax}$) of the wavelength band A is input from the first input/output waveguide 202 to the first slab waveguide 203 and propagates through the first slab waveguide 203. Herein, the optical filter 221 reflects the light of the wavelength band A, so that the signal light 252 is reflected at the same angle as an incident angle and propagates in a direction of the connection 213 between the first slab waveguide 203 and the second channel waveguide group 206. At that time, the first slab waveguide 203 has no confinement in a direction parallel to a plane of the substrate 201, so that a spot size of the signal light 252 is enlarged together with the propagation, and the signal light 252 is distributed in a vertically inverted manner at the connection 213 between the first slab waveguide 203 and an input port of the second channel waveguide group 206 by the reflection by the optical filter 221. At that time, the connection 213 between the first slab waveguide 203 and the input port of the second channel waveguide group 206 is formed into a circular arc shape with the center of curvature 242 on a virtual image of the connection 211 between the first input/output waveguide 202 and the first slab waveguide 203 on the interference membrane filter 221 as a mirror surface when seen from a side of the connection 213, so that the signal light 252 is incident on the second channel waveguide group 206 in the same phase to be distributed to each of the channel waveguides.

The channel waveguides forming the second channel waveguide group 206 have different lengths, so that the signal light with a phase shift is output from each channel waveguide at an output port of the second channel waveguide group 206. When the waveguide path length difference of the second channel waveguide group 206 is set to ΔL', the phase difference φ between adjacent channel waveguides is represented by equation (1) described above and it is understood that this depends on the wavelength of the signal light. When equation (1) is differentiated by a wavelength λ', equation (2) described above is obtained and it is understood that the wavelength dependency δφ of the phase difference is proportional to wavelength change δλ'.

The signal light 252 subjected to the phase change by the second channel waveguide group 206 is output from the connection 215 of the second channel waveguide group 206 to the second slab waveguide 207. At that time, there is the phase difference between the channel waveguides, so that the equiphase surface is inclined with respect to an end face 207c of the second slab waveguide 207. Since the phase difference φ has the wavelength dependency, the inclination of the equiphase surface also has the wavelength dependency. When the interval on a circular arc between the channel waveguides forming the second channel waveguide group 206 is set to s, the inclination 58 of the phase surface between the wavelengths (δλ') is represented by equation (3) described above from equation (2) described above.

Therefore, the signal light 252 (wavelengths $\lambda_{a1}$ to $\lambda_{an}$) of the wavelength band A with the wavelength interval δλ' is propagated in directions different by an angular interval 58.

The signal light 252 output from the connection 215 of the second channel waveguide group 206 to the second slab waveguide 207 travels in a direction of an end face 207d of the second slab waveguide 207. Further, an end face 206a of the second channel waveguide group 206 has the circular arc shape and the center of curvature 248 thereof is on the end face 207d of the second slab waveguide 207, so that wavelength-multiplexed light $\lambda_{a1}$ to $\lambda_{an}$ is concentrated on the end face 207d of the second slab waveguide 207 to be output from the second input/output waveguide 210 respectively.

An example of a wavelength distribution characteristic when the signal light of each wavelength $\lambda_{b1}$ to $\lambda_{bn}$ incident from each port $I_1$ to $I_n$ of the first input/output waveguide 202 is wavelength-distributed to be output to each port $Q_1$ to $Q_n$ of the second input/output waveguide 209 as illustrated in FIG. 13 on the above-described operating principle is illustrated in FIG. 24(b) and an example of the wavelength distribution characteristic when the signal light of each wavelength $\lambda_{a1}$ to $\lambda_{an}$ incident from each of the port $I_1$ to $I_n$ of the first input/output waveguide 202 is wavelength-distributed to be output to each port $P_1$ to $P_n$ of the second input/output waveguide 210 as illustrated in FIG. 14 is illustrated in FIG. 24(a).

Figure 15:
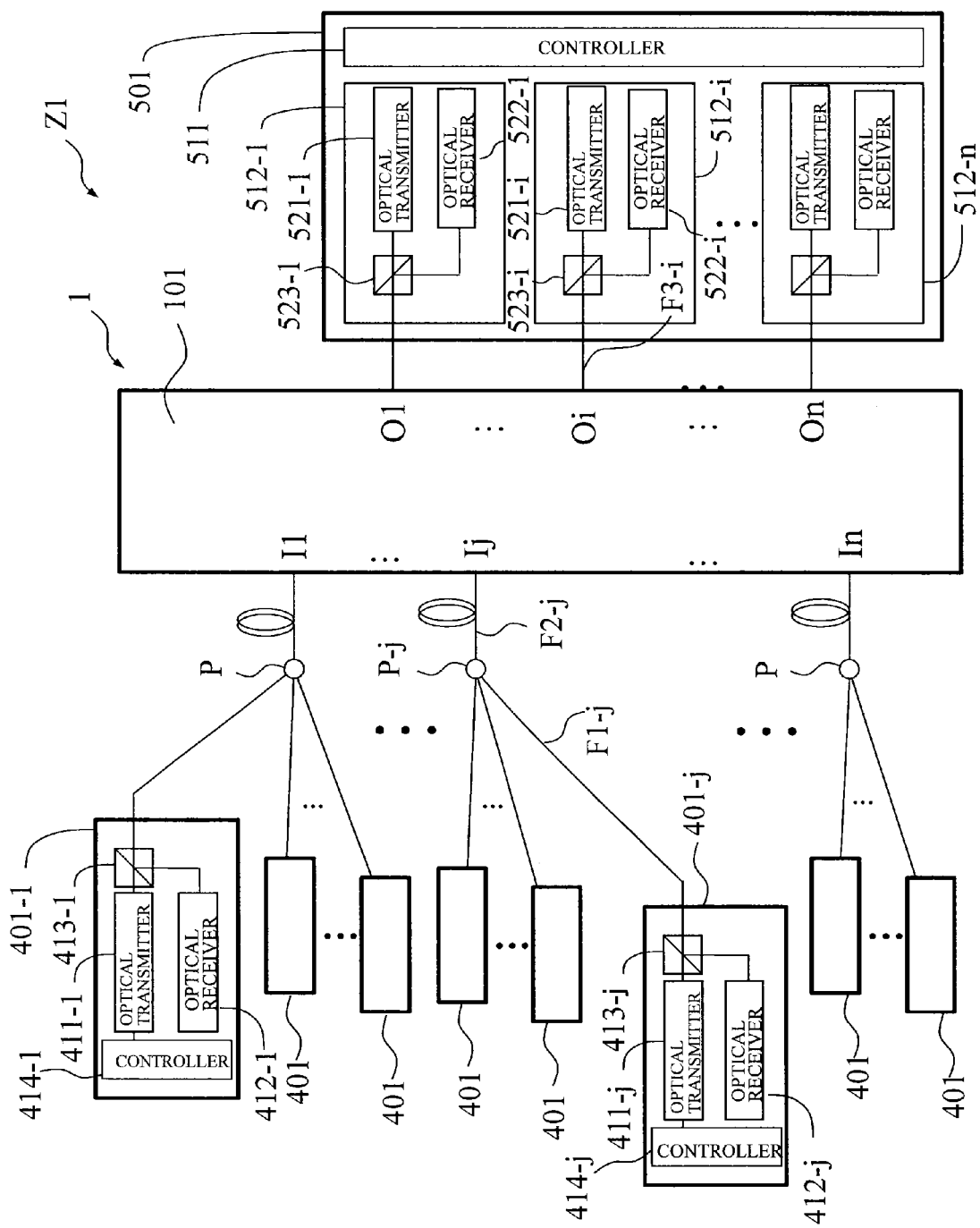
FIG. 15 is a schematic diagram of an aspect of an optical communications system in which the arrayed waveguide grating according to the first embodiment of the present invention is used.

Meanwhile, in the above-described examples in FIGS. 14 and 15, a case in which the signal light is incident from a side of the first input/output waveguide 202 and the signal light is emitted from a side of the second input/output waveguide 209 or 210 is described; however, the same applies to a case in which the signal light is incident from the side of the second input/output waveguide 209 or 210 and the signal light is emitted from the side of the first input/output waveguide 202.

A method of designing similar to the method of designing described in the above-described first embodiment may be used as the method of designing the arrayed waveguide grating 2 according to this embodiment, so that description thereof is omitted.

For example, as in the first embodiment, in order to distribute the signal light of the two wavelength bands which are the wavelength bands A and B bi-directionally over a single fiber in the first slab waveguide 203 and the second slab waveguide 207, in the first slab waveguide 203, a slab length a being a length of an axis (slab central axis 231) connecting the center of curvature 241 on the connection 211 between the first input/output waveguide 202 and the first slab waveguide 203 and the center of curvature 242 on the connection 212 between the first channel wave group 205 and the first slab waveguide 203 is preferably made equal to a slab length b which is a sum of a length on the slab central axis 231 from the center of curvature 241 on the connection 211 between the first input/output waveguide 202 and the first slab waveguide 203 to the optical filter 221 arranged in the first slab waveguide 203 and a length on the slab central axis 132 from the center of curvature 243 on the connection 213 between the second channel waveguide group 206 and the first slab waveguide 203 to the optical filter 221 arranged in the first slab waveguide 203. When the slab lengths a and b are made equal, a distance the signal light of the wavelength band A passing through the optical filter (interference membrane filter) 221 arranged in the first slab waveguide 203 propagates through the first slab waveguide 203 and a distance which the signal light of the wavelength band B reflected by the optical filter (interference membrane filter) 221 propagates through the slab waveguide the first slab waveguide 203 are equal to each other.

Further, as in the first embodiment, in the first slab waveguide 203 and the second slab waveguide 207, in order to distribute the signal light of the two wavelength bands which are the wavelength bands A and B bi-directionally over a single fiber, the slab central axes 231 and 232 (refer to FIG. 12) in the first slab waveguide 203 are preferably orthogonal to each other. The slab central axes 233 and 234 (refer to FIG. 12) in the second slab waveguide 207 are preferably orthogonal to each other and it is the most preferably that it is formed such that both of the slab central axes 231 and 232 and the slab central axes 233 and 234 are orthogonal to each other.

Since the arrayed waveguide grating 2 according to the second embodiment of the present invention described above has a configuration in which the optical filter 221 is arranged in the first slab waveguide 203 formed on the substrate 201, this may wavelength-distribute the wavelength-multiplexed signal light of different wavelength bands with different wavelength intervals bi-directionally over a single fiber in a single planar lightwave circuit, so that a miniaturized single-side input/output waveguide integrated arrayed waveguide grating 2 is obtained at a low cost.

Third Embodiment

An example of an optical communications system Z1 in which an arrayed waveguide grating 1 according to the present invention is used is hereinafter described with reference to the drawings.

FIG. 15 is a schematic diagram of an aspect of the optical communications system Z1 in which the arrayed waveguide grating 1 according to a first embodiment of the present invention is used. The optical communications system Z1 illustrated in FIG. 15 is a wavelength-variable WDM/TDM-PON in which a wavelength band and a wavelength interval of upstream are different from those of downstream in which a both-side input/output waveguide integrated arrayed waveguide grating 1 according to the first embodiment is used.

The optical communications system Z1 illustrated in FIG. 15 is formed of the arrayed waveguide grating 1, a subscriber device 401, a station side device 501, and optical fibers F1 to F3 connecting them in which a plurality of subscriber devices 401 is connected to each port through an optical power splitter P. Meanwhile, as the optical communications system Z1, problem that here is no one subscriber device 401 may be directly connected to each port $I_1$ to $I_n$ on a subscriber side of the arrayed waveguide grating 1 without the optical power splitter P.

It is hereinafter described supposing that signal light transmitted from the station side device 501 to the subscriber device 401 is a downstream signal and signal light transmitted from the subscriber device 401 to the station side device 501 is an upstream signal.

The station side device 501 forming the optical communications system Z1 is provided with one or more optical transmitter/receivers 512 and a controller 511 and the optical transmitter/receiver 512 is provided with an optical transmitter 521 which transmits the downstream signal, an optical receiver 522 which receives the upstream signal, and an optical multiplexer/demultiplexer 523 formed of a wavelength filter and the like which multiplexes/demultiplexes the upstream signal and the downstream signal. The optical transmitter 521 has a characteristic to transmit the signal light with a wavelength interval Y and has a function to change an output wavelength to $\lambda_{b1}$ to $\lambda_{bn}$.

On the other hand, the subscriber device 401 is provided with an optical transmitter 411 which transmits the upstream signal, an optical receiver 412 which receives the downstream signal, an optical multiplexer/demultiplexer 413 formed of a wavelength filter and the like which multiplexes/demultiplexes the upstream signal light and the downstream signal light, and a controller 414. The optical transmitter 411 has a characteristic to transmit the signal light with a wavelength interval X and has a function to change an output wavelength to $\lambda_{a1}$ to $\lambda_{an}$.

Figure 16:
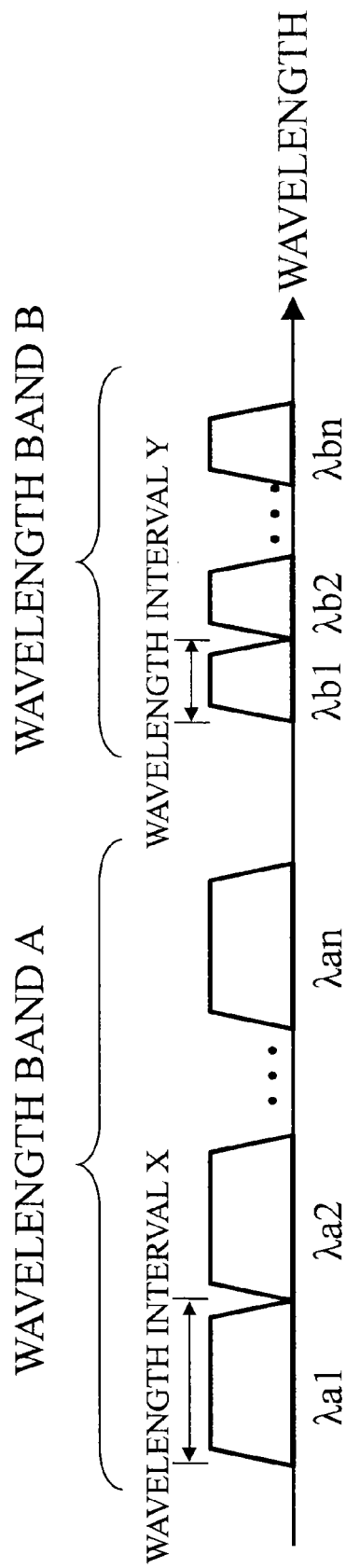
FIG. 16 is a schematic diagram of an example of a wavelength arrangement.

FIG. 16 is a schematic diagram of an example of a wavelength arrangement. As illustrated in FIG. 16, optical signals $\lambda_{a1}$ to $\lambda_{an}$ of a wavelength band A with the wavelength interval X form the upstream signal and optical signals $\lambda_{b1}$ to $\lambda_{bn}$ of a wavelength band B different from the wavelength band A with the wavelength interval Y (X>Y) form the downstream signal.

The arrayed waveguide grating 1 is provided with the subscriber side ports $I_1$ to $I_n$ and station side ports $O_1$ to $O_n$ (n is an integer) as specifically described in the first embodiment. A relationship among the station side port, the subscriber side port, and the input/output wavelength has a cyclic property as illustrated in FIGS. 23(a) and 23(b) described above. Meanwhile, the subscriber devices or subscriber device groups connected to the subscriber side ports $I_1$ to $I_n$ of the arrayed waveguide grating 1 are set to PON-1 to PON-n, respectively.

In an example of a flow of the signal in the optical communications system Z1 illustrated in FIG. 15, the flow of the downstream signal is first described. The downstream signal of a wavelength $\lambda_{bx}$ (1≤x≤n: n is an integer) with the wavelength interval Y transmitted from an optical transmitter 521-i in an optical transmitter/receiver 512-i (1≤i≤n: i is an integer) in the station side device 501 is input to a station side port $O_i$ on a substrate 101 of the arrayed waveguide grating 1 through a wavelength multiplexer/demultiplexer 523-i and an optical fiber F3-i. The downstream signal input to $O_i$ is passively output to a subscriber side port $I_j$ (1≤j≤n: j is an integer) according to a correspondence table of the wavelength and the port illustrated in FIG. 23(b). The downstream signal output from $I_j$ arrives at an optical power splitter P-j through an optical fiber F2-j. Such downstream signal is evenly distributed at the optical power splitter P-j, then evenly arrives at all the subscriber devices downstream the optical power splitter P-j, that is, PON-j. The downstream signal arrives at a subscriber device 401-j through an optical fiber F1-j.

Meanwhile, regarding the downstream signal in the optical communications system Z1, an output wavelength and an output timing of the optical transmitter/receiver 512 in the station side device 501 are controlled such that only one downstream signal is input at a certain time to the optical receiver in one subscriber device 401.

Next, a flow of the upstream signal in the optical communications system Z1 is described. The upstream signal of a wavelength $\lambda_{ay}$ (1≤y≤n: y is an integer) with the wavelength interval X transmitted from an optical transmitter 411-j in the subscriber device 401-j (1≤j≤n: j is an integer) is input to the subscriber side port of the arrayed waveguide grating 1 through a wavelength multiplexer/demultiplexer 413-j, the optical fiber F1-j, the optical power splitter P-j, and the optical fiber F2-j. The upstream signal input to is passively output to the station side port $O_i$ (1≤i≤n: i is an integer) according to a correspondence table between the wavelength and the port illustrated in FIG. 23(a). The upstream signal output from $O_i$ arrives at an optical receiver 522-i through the optical fiber F3-i and through the wavelength multiplexer/demultiplexer 523-i in the optical transmitter/receiver 512-i in the station side device 501.

Meanwhile, in the upstream signal in the optical communications system Z1 also, as in the downstream signal described above, the output wavelength and the output timing of the optical transmitter 411 in the subscriber device 401 are controlled such that only one upstream signal is input at a certain time to the optical receiver 522 in one station side device 501.

Figure 17:
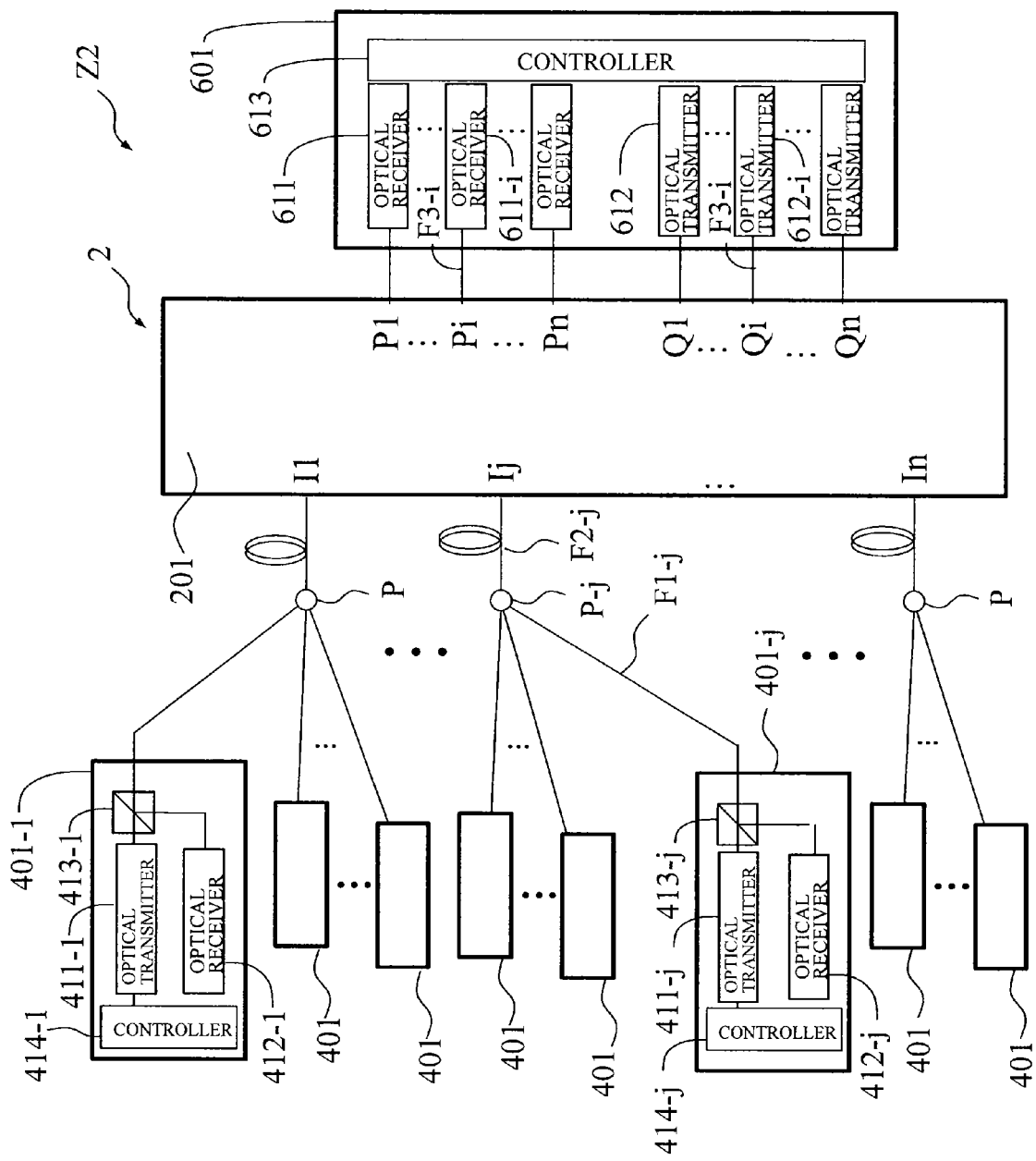
FIG. 17 is a schematic diagram of an aspect of an optical communications system in which the arrayed waveguide grating according to the second embodiment of the present invention is used.

FIG. 17 is a schematic diagram of an aspect of an optical communications system Z2 in which an arrayed waveguide grating 2 according to a second embodiment of the present invention is used. The optical communications system Z2 illustrated in FIG. 17 is a wavelength-variable WDM/TDM-PON in which the wavelength band and the wavelength interval of upstream are different from those of downstream in which a single-side input/output waveguide integrated arrayed waveguide grating 2 according to the second embodiment is used.

The optical communications system Z2 illustrated in FIG. 17 is formed of the arrayed waveguide grating 2, a subscriber device 401, a station side device 601, and an optical fiber F connecting them. A plurality of subscriber devices 401 is connected to each port through an optical power splitter P. Meanwhile, as the optical communications system Z2, there is no problem that one subscriber device 401 may be directly connected to each port $I_1$ to $I_n$ on a subscriber side of the arrayed waveguide grating 2 without the optical power splitter P.

It is hereinafter described supposing that signal light transmitted from the station side device 601 to the subscriber device 401 is a downstream signal and signal light transmitted from the subscriber device 401 to the station side device 601 is an upstream signal.

The station side device 601 forming the optical communications system Z2 is provided with one or more optical receivers 611 connected to station side ports $P_1$ to $P_n$ on a substrate 201 of the arrayed waveguide grating 2, one or more optical transmitters 612 connected to station side ports $Q_1$ to $Q_n$, and a controller 613. The optical transmitter 612 has a characteristic to transmit the signal light with a wavelength interval Y and has a function to change an output wavelength to $\lambda_{b1}$ to $\lambda_{bn}$.

On the other hand, the subscriber device 401 is provided with an optical transmitter 411 which transmits the upstream signal, an optical receiver 412 which receives the downstream signal, an optical multiplexer/demultiplexer 413 formed of a wavelength filter and the like which multiplexes/demultiplexes the upstream signal light and the downstream signal light, and a controller 414. The optical transmitter 411 has a characteristic to transmit the signal light with the wavelength interval X and has a function to change an output wavelength to $\lambda_{a1}$ to $\lambda_{an}$. A wavelength arrangement of the upstream signals $\lambda_{a1}$ to $\lambda_{an}$ and the downstream signals $\lambda_{b1}$ to $\lambda_{bn}$ is as illustrated in FIG. 16 described above, and this is the same as that of the optical communications system Z1 in FIG. 15.

The arrayed waveguide grating 2 is provided with the subscriber side ports $I_1$ to $I_n$ and two station side ports $P_1$ to $P_n$ and $Q_1$ to $Q_n$ (n is an integer) as specifically described in the second embodiment. A relationship among the station side port, the subscriber side port, and the input/output wavelength has a cyclic property as illustrated in FIGS. 25(a) and 25(b) described above. Meanwhile, the subscriber devices or subscriber device groups connected to the subscriber side ports $I_1$ to $I_n$ of the arrayed waveguide grating 2 are set to PON-1 to PON-n, respectively.

In an example of a flow of the signal in the optical communications system Z2 illustrated in FIG. 17, the flow of the downstream signal is first described. The downstream signal of a wavelength $\lambda_{bx}$ (1≤x≤n: n is an integer) with the wavelength interval Y transmitted from an optical transmitter 612-$i$ (1≤i≤n: i is an integer) in the station side device 601 is input to the station side port $Q_i$ on the substrate 201 of the arrayed waveguide grating 2 through an optical fiber F3-$i$. The downstream signal input to $Q_i$ is passively output to a subscriber side port $I_j$ (1≤j≤n: j is an integer) according to a correspondence table of the wavelength and the port illustrated in FIG. 25(b). The downstream signal output from $I_j$ arrives at an optical power splitter P-j through an optical fiber F2-$j$. The downstream signal is evenly distributed at the optical power splitter P-j, then evenly arrives at all the subscriber devices downstream the optical power splitter P-j, that is, PON-js. The downstream signal arrives at a subscriber device 401-$j$ through an optical fiber F1-$j$.

Meanwhile, regarding the downstream signal in the optical communications system Z2, an output wavelength and an output timing of the optical transmitter in the station side device 601 are controlled such that only one downstream signal is input at a certain time to the optical receiver in one subscriber device 401.

Next, a flow of the upstream signal in the optical communications system Z2 is described. The upstream signal of the wavelength $\lambda_{ay}$ (1≤y≤n: y is an integer) with the wavelength interval X transmitted from an optical transmitter 411-$j$ in the subscriber device 401-$j$ (1≤j≤n: j is an integer) is input to the subscriber side port on the substrate 201 of the arrayed waveguide grating 2 through a wavelength multiplexer/demultiplexer 413-$j$, the optical fiber F1-$j$, the optical power splitter P-j, and the optical fiber F2-$j$. The upstream signal input to $I_j$ is passively output to the station side port $P_i$ (1≤i≤n: i is an integer) according to a correspondence table between the wavelength and the port illustrated in FIG. 25(a). The upstream signal output from $P_i$ arrives at an optical receiver 611-$i$ in the station side device 601 through the optical fiber F3-$i$.

Meanwhile, in the upstream signal in the optical communications system Z2 also, as in the downstream signal described above, the output wavelength and the output timing of the optical transmitter 411 in the subscriber device 401 are controlled such that only one upstream signal is input at a certain time to the optical receiver 611 in one station side device 601.

The optical communications system Z2 described above is provided with the arrayed waveguide grating 2 according to the present invention described above in which an inexpensive wavelength-variable light source with a broad wavelength interval may be used as the transmitter in the subscriber device, and the wavelength-variable WDM/TDM-PON in which the wavelength band and the wavelength interval of the upstream signal are different from those of the downstream signal may be economically realized. The number of wavelength multiplexer/demultiplexers through which the signal light passes may be reduced in the station side device and the arrayed waveguide grating 2 and the wavelength-variable WDM/TDM-PON whose optical power loss is reduced.

Fourth Embodiment

Meanwhile, the above-described aspect is an aspect of the present invention, and it goes without saying that the present invention is not limited to the above-described embodiments and modification and improvement within the scope in which an object and an effect may be achieved provided with the configuration of the present invention are included in the present invention. Specific structure and shape when carrying out the present invention may be another structure and another shape within the scope in which the object and effect of the present invention may be achieved without problem. The present invention is not limited to the above-described embodiments and the modification and improvement within the scope in which the object of the present invention may be achieved is included in the present invention.

An arrayed waveguide grating 1 according to the above-described first embodiment is such that a first slab waveguide 103, a second slab waveguide 107, a first input/output waveguide 102 connected to the first slab waveguide 103, a second input/output waveguide 109 connected to the second slab waveguide 107, a first channel waveguide group 105 with both ends connected to the first slab waveguide 103 and the second slab waveguide 107, and a second channel waveguide group 106 with both ends connected to the first slab waveguide 103 and the second slab waveguide 107 are formed on a substrate 101. Each of the first channel waveguide group 105 and the second channel waveguide group 106 is formed of a plurality of channel waveguides having path lengths sequentially becoming longer by a predetermined path length difference respectively. It is further configured such that an optical filter 121 is inserted into a slit 104 formed in a part of the first slab waveguide 103 and an optical filter 122 is inserted into a slit 108 formed in a part of the second slab waveguide 107. On the other hand, as the arrayed waveguide grating 1 according to the present invention, following configurations illustrated in FIGS. 18 to 20 provided with such configuration may also be used.

Figure 18:
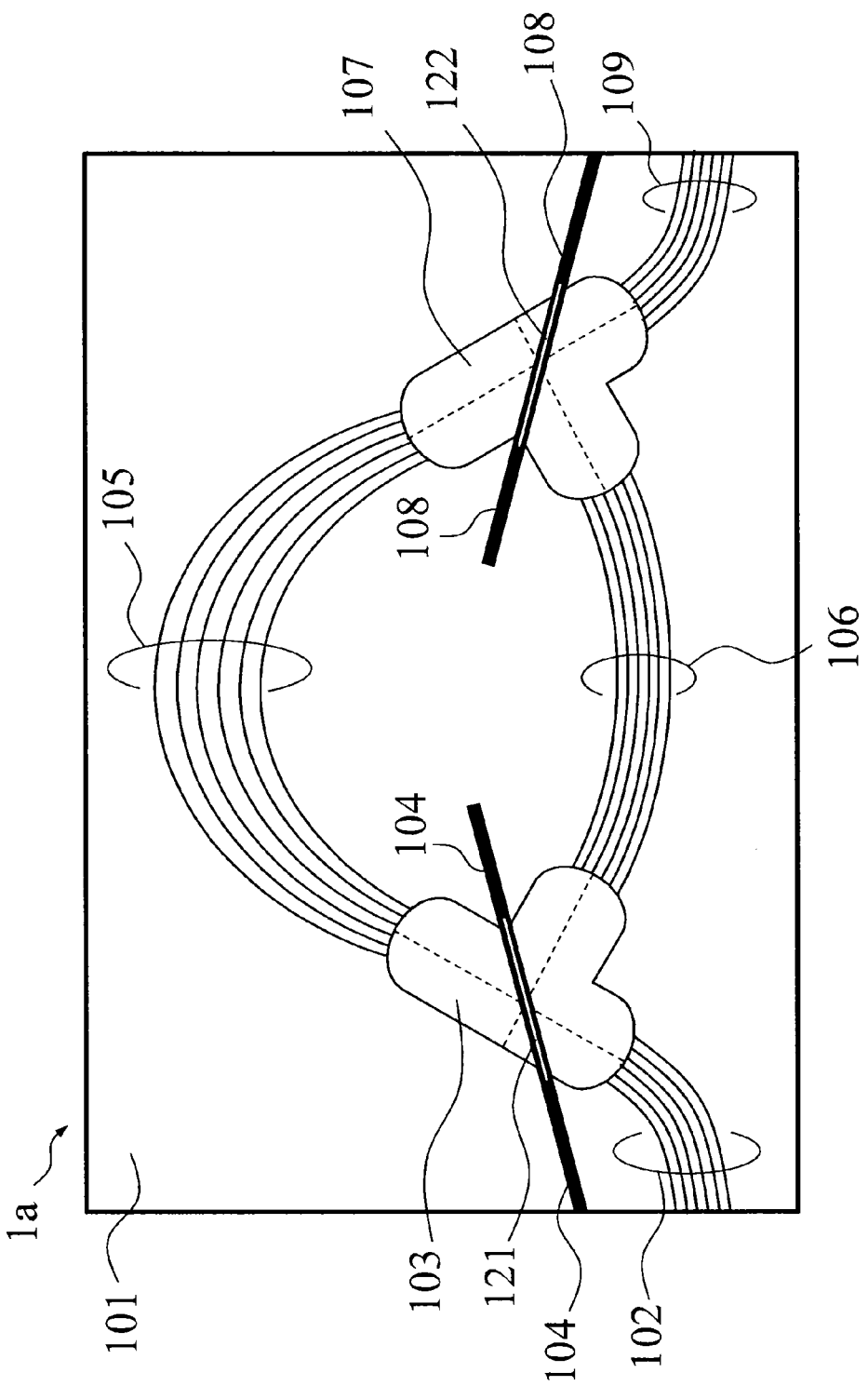
FIG. 18 is a schematic diagram of another aspect of the arrayed waveguide grating according to the first embodiment.
Figure 19:
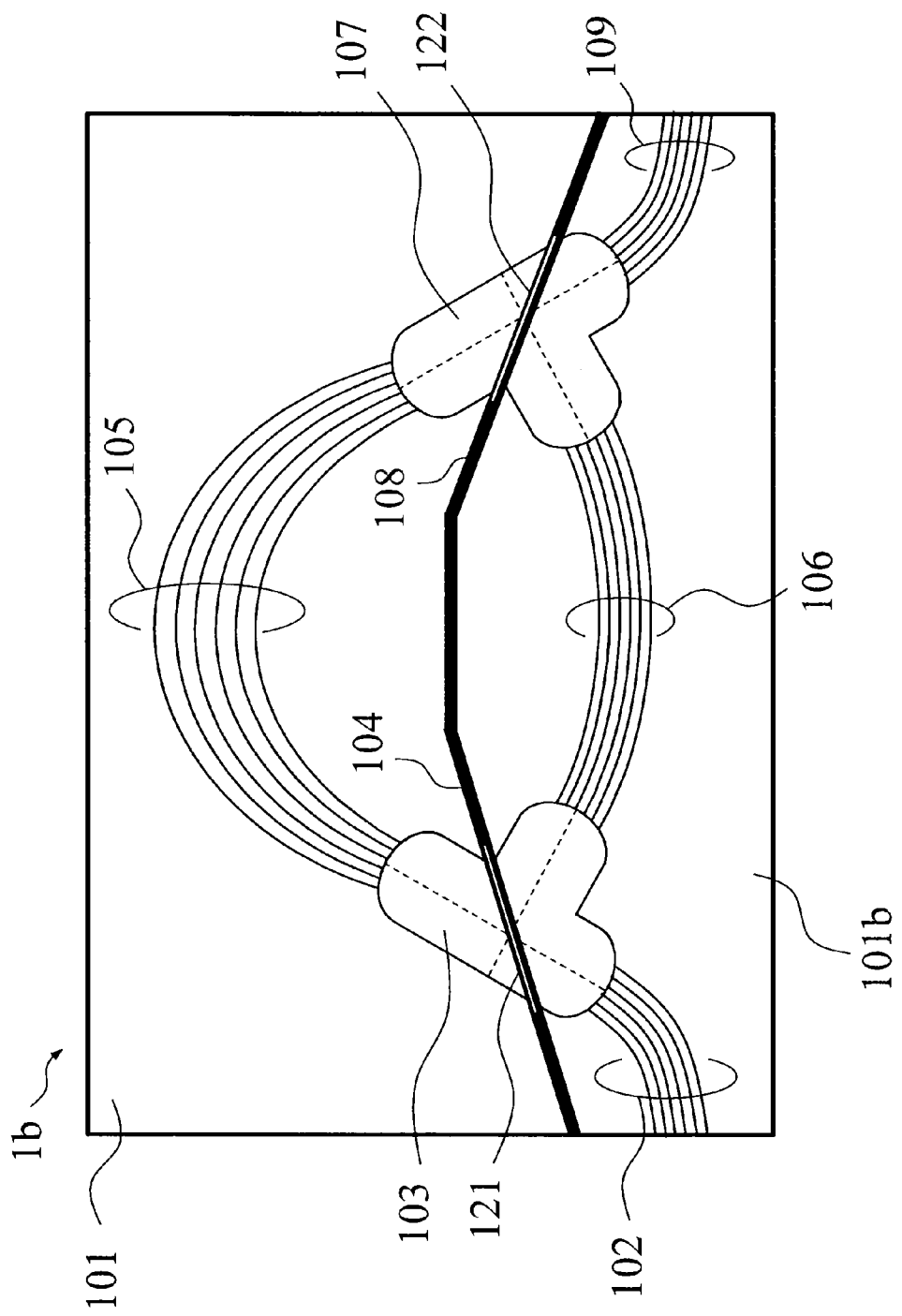
FIG. 19 is a schematic diagram of another aspect of the arrayed waveguide grating according to the first embodiment.
Figure 20:
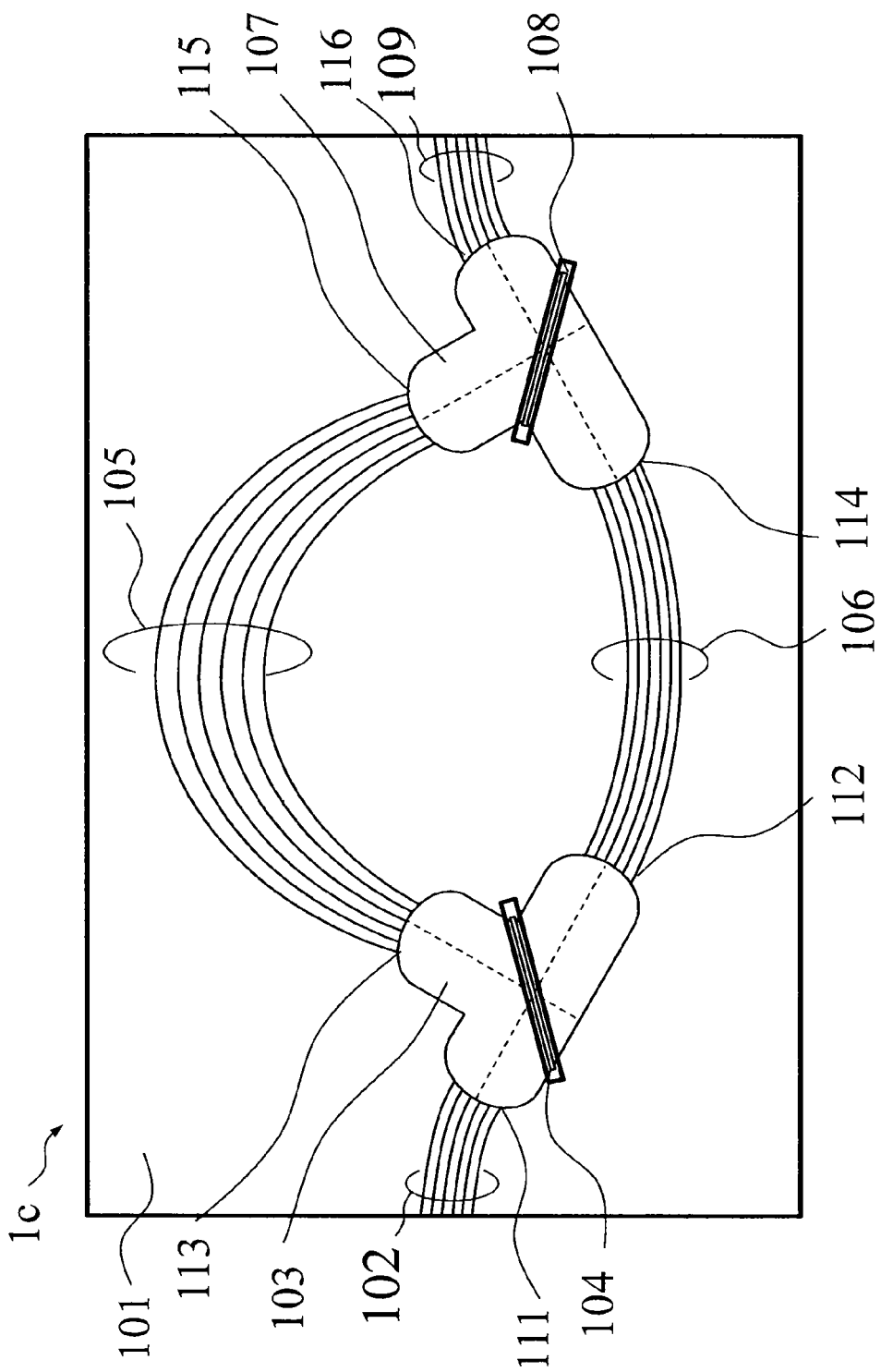
FIG. 20 is a schematic diagram of another aspect of the arrayed waveguide grating according to the first embodiment.

FIGS. 18 to 20 are schematic diagrams of another aspect of the arrayed waveguide grating 1 according to the first embodiment of the present invention.

In an arrayed waveguide grating 1$a$ illustrated in FIG. 18 with the configuration of the above-described first embodiment, a dicing saw is used for forming the slits 104 and 108; a groove is formed from an end face of the substrate 101 across the first slab waveguide 103 to form the slit 104 for forming the slit 104 in the first slab waveguide 103. A groove is also formed from the end face of the substrate 101 across the second slab waveguide 107 to form the slit 108 for forming the slit 108 in the second slab waveguide 107. The optical filters (interference membrane filters) 121 and 122 are inserted into the slits 104 and 108 formed in this manner.

Meanwhile, the optical filters (interference membrane filters) 121 and 122 at an incident angle of 45 degrees are used as the optical filters (interference membrane filters) 121 and 122 forming the arrayed waveguide grating 1a. Slab central axes 131 and 132 of the first slab waveguide 103 are formed at angles of $\theta+\pi/4$ (rad.) and $\theta-\pi/4$ (rad.), respectively, with respect to the substrate 101 and the slit 104 is formed at an angle of $\theta$ with respect to the substrate 101. Slab central axes 133 and 134 of the second slab waveguide 107 are formed at angles of $\theta+\pi/4$ (rad.) and $\theta-\pi/4$ (rad.), respectively, with respect to the substrate 101 and the slit 108 is formed to at an angle of $\theta$ with respect to the substrate 101.

Meanwhile, a type of the interference membrane filters 121 and 122 described as the optical filters is not especially limited and the one having a characteristic in FIG. 2 described above or an optional configuration capable of performing wavelength multiplexing/demultiplexing in FIG. 3 may be used, for example.

The above-described relationship among the slab central axes 131 to 134 and the angles of the slits 104 and 108 with respect to the substrate 101 are exemplary and they may be set at an optional angle according to the characteristic of the optical filter. Further, as a method of forming the slits 104 and 108 also, optional means such as wet etching, dry etching, sandblasting and the like may be used in addition to the dicing saw.

In an arrayed waveguide grating 1b illustrated in FIG. 19 with the configuration of the above-described first embodiment, the first slab waveguide 103, the second slab waveguide 107, the first input/output waveguide 102 connected to the first slab waveguide 103, the second input/output waveguide 109 connected to the second slab waveguide 107, the first channel waveguide group 105 with both ends connected to the first slab waveguide 103 and the second slab waveguide 107, and the second channel waveguide group 106 with the both ends connected to the first slab waveguide 103 and the second slab waveguide 107 are formed on the substrate 101 and a substrate 101b.

In the arrayed waveguide grating 1b illustrated in FIG. 19, each of the first channel waveguide group 105 and the second channel waveguide group 106 is formed of a plurality of channel waveguides having the path lengths sequentially becoming longer by a predetermined path length difference. Further, the optical filters (interference membrane filters) 121 and 122 are interposed between the substrate 101 and the substrate 101b across the first slab waveguide 103 and the second slab waveguide 107, respectively.

Meanwhile, such substrates 101 and 101b may be separately fabricated or may be formed such that one substrate is fabricated in advance and this is separated to the substrates 101 and 101b by well known means such as the dicing, wet etching, dry etching, and sandblasting.

Further, an arrayed waveguide grating 1c illustrated in FIG. 20 with the configuration of the above-described first embodiment is configured such that a connection part between the first input/output waveguide 102 and the first slab waveguide 103 is a connection 111, a connection part between the second input/output waveguide 109 and the second slab waveguide 107 is a connection 116, a connection part between the first slab waveguide 103 and the first channel waveguide group 105 is a connection 113, a connection part between the first slab waveguide 103 and the second channel waveguide group 106 is a connection 112, a connection part between the second slab waveguide 107 and the first channel waveguide group 105 is a connection 115, and a connection part between the second slab waveguide 107 and a second channel waveguide group 106 is a connection 114. By such configuration, signal light passing through the optical filter (interference membrane filter) 104 arranged in the first slab waveguide 103 propagates through the second channel waveguide group 106 and the signal light reflected by the optical filter (interference membrane filter) 104 propagates through the first channel waveguide group 105.

Figure 21:
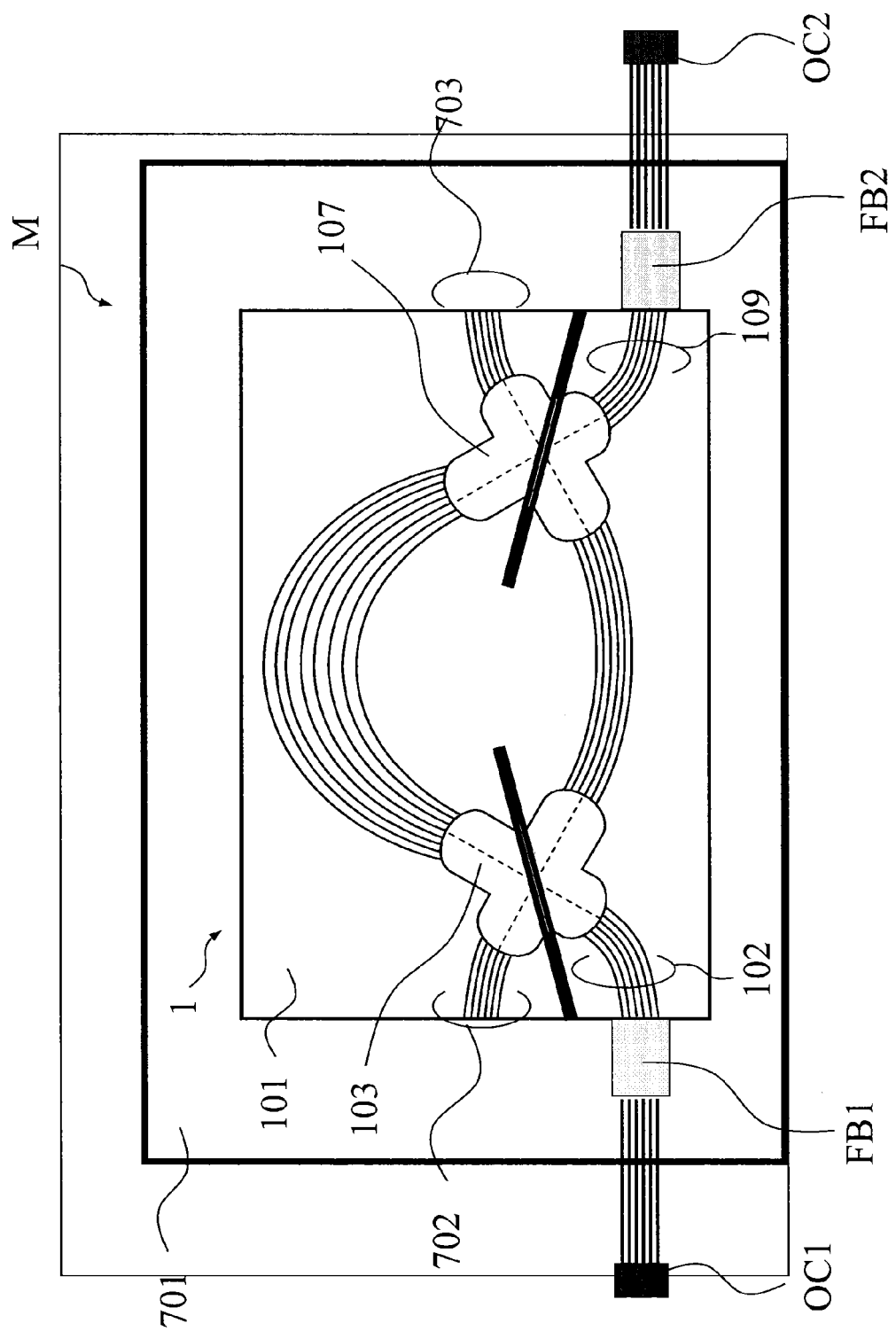
FIG. 21 is a schematic diagram of an aspect of an optical module provided with the arrayed waveguide grating according to the first embodiment of the present invention.
Figure 22:
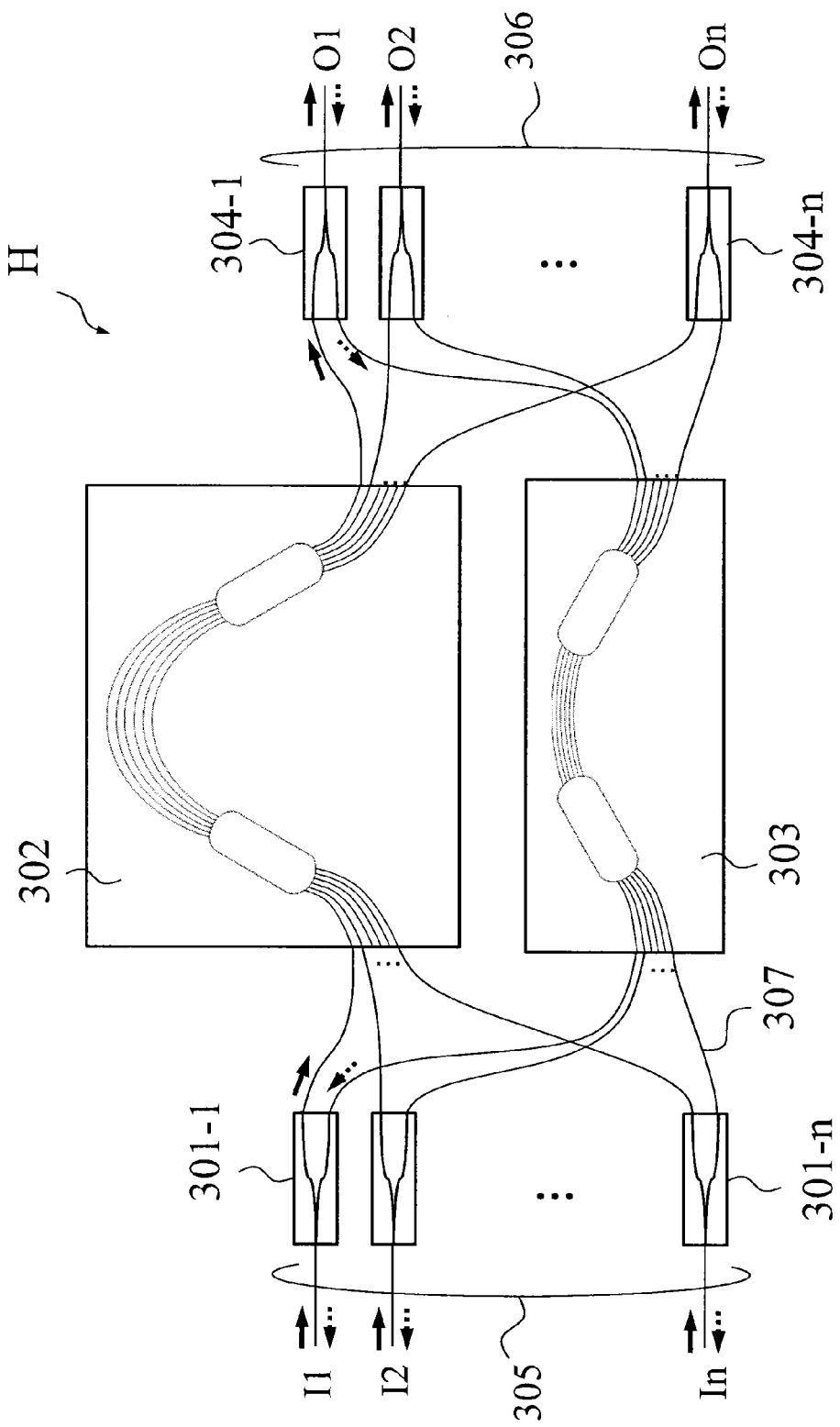
FIG. 22 is a schematic diagram of an example of a conventional wavelength distributor.

Meanwhile, FIG. 21 is a schematic diagram of an example of an embodiment of an optical module M provided with the arrayed waveguide grating 1 according to the first embodiment of the present invention. As illustrated in FIG. 21, the optical module M is such that a first fiber block FB1 obtained by bundling one or a plurality of optical fibers not illustrated is connected to the first input/output waveguide 102 of the substrate 101 in the arrayed waveguide grating 1 according to the first embodiment put in a casing 701 and a second fiber block FB2 obtained by bundling one or a plurality of optical fibers not illustrated is connected to the second input/output waveguide 109. The optical module M is capable of inputting/outputting signal light from outside to/from the arrayed waveguide grating 1 of the present invention by means of a first optical connector OC1 connected to the first fiber block FB1 and a second optical connector OC2 connected to the second fiber block FB2.

Meanwhile, in FIG. 21, an aspect in which monitor ports 702 and 703 are connected to the first slab waveguide 103 and the second slab waveguide 107 forming the arrayed waveguide grating 1 is illustrated as the optical module M.

In addition, specific structure, shape and the like when carrying out the present invention may be made another structure and the like within the scope in which the object of the present invention may be achieved.

INDUSTRIAL APPLICABILITY

The present invention may be used in information and communication industries.

REFERENCE SIGNS LIST 1, 1a, 1b, 1c, 2 Arrayed waveguide grating
101, 201 Substrate
102, 202 First input/output waveguide
103, 203 First slab waveguide
104, 108, 204, 208 Slit
105, 205 First channel waveguide
105a, 205a End face of first channel waveguide
106, 206 Second channel waveguide
106a, 206a End face of second channel waveguide
107, 207 Second slab waveguide
107a, 107b, 107c, 207a, 207b, 207c End of second slab waveguide
109, 209, 210 Second input/output waveguide
121, 122, 221 Optical filter (interference membrane filter)
111 to 116, 211 to 216 Slab central axis
131 to 134, 231 to 234 Slab central axis
141 to 146, 241 to 246, 248 Center of curvature
401 Subscriber device
411 Optical transmitter
412 Optical receiver
413 Optical multiplexer/demultiplexer 414 Controller
501, 601 Station side device
511, 613 Controller
512 Optical transmitter/receiver
521, 612 Optical transmitter
522, 611 Optical receiver
523 Optical multiplexer/demultiplexer
701 Casing
702, 703 Monitor port
F Optical fiber
FB1 First fiber block
FB2 Second fiber block
M Optical module
OC1 First optical connector
OC2 Second optical connector
P Optical power splitter
S Slab waveguide
Z1, Z2 Optical communications system
a, b, c, d Slab length
H Conventional wavelength distributor
302, 303 Arrayed waveguide grating
301, 304 Optical filter
305, 306 Input/output port
307 Optical fiber

What is claimed is:

1. An arrayed waveguide grating comprising:
a first slab waveguide formed on a substrate;
a second slab waveguide formed on the substrate;
a first input/output waveguide connected to the first slab waveguide;
a second input/output waveguide connected to the second slab waveguide;
two or more channel waveguide groups connecting the first and second slab waveguides, each of the channel waveguide groups formed of an aggregate of a plurality of channel waveguides having path lengths sequentially becoming longer by a predetermined path length difference; and
an optical filter arranged in at least one of the first and second slab waveguides,
wherein:
the optical filter demultiplexes signal light input from the first input/output waveguide connected to the first slab waveguide or the second input/output waveguide connected to the second slab waveguide, the first or second slab waveguide in which the optical filter is arranged, to the two or more channel waveguide groups for each wavelength band, or
multiplexes the signal light input from the two or more channel waveguide groups for each wavelength band to the first input/output waveguide connected to the first slab waveguide or the second input/output waveguide connected to the second slab waveguide, the first or second slab waveguide in which the optical filter is arranged, and
wherein:
the two or more channel waveguide groups have different path lengths differences,
each wavelength band has a different wavelength interval of signal light, and
the signal light passes through the two or more channel waveguide groups corresponding to the wavelength band.

2. The arrayed waveguide grating according to claim 1, wherein
connections to the channel waveguide groups are formed in the first and second slab waveguides, and the number of the connections is the same as the number of the channel waveguide groups.

3. The arrayed waveguide grating according to claim 1, wherein
at least either of two slab central axes formed in the first slab waveguide or two slab central axes formed in the second slab waveguide are orthogonal to each other.

4. The arrayed waveguide grating according to claim 1, wherein
at least one of an angle between two slab central axes formed in the first slab waveguide on a side interposed between the channel waveguide groups and an angle between two slab central axes formed in the second slab waveguide on a side interposed between the channel waveguide groups is smaller than 90 degrees.

5. The arrayed waveguide grating according to claim 1, wherein
at least either of two slab lengths in the first slab waveguide or two slab lengths in the second slab waveguide are the same.

6. The arrayed waveguide grating according to claim 1, wherein
a central axis on a side of the first input/output waveguide or a central axis on a side of the second input/output waveguide is shifted from a central axis on a side of the channel waveguide group by an amount of a shift of an optical path generated by passage through the optical filter of light passing through the optical filter in any of the first and second slab waveguides in which the optical filter is arranged.

7. An optical module comprising:
the arrayed waveguide grating according to claim 1;
a first fiber block in which at least one fiber is held connected to the first input/output waveguide forming the arrayed waveguide grating;
a second fiber block in which at least one optical fiber is held connected to the second input/output waveguide forming the arrayed waveguide grating;
a first optical connector connected to the first fiber block; and
a second optical connector connected to the second fiber block.

8. An optical communications system comprising:
the arrayed waveguide grating according to claim 1;
a subscriber device; and
a station side device, wherein
the arrayed waveguide grating, the subscriber device, and the station side device are connected by means of an optical fiber, and
a wavelength band and a wavelength interval of signal light input from one input/output waveguide group in the arrayed waveguide grating are different from a wavelength band and a wavelength interval of signal light input from the other input/output waveguide group.

9. The arrayed waveguide grating according to claim 2, wherein
at least either of two slab central axes formed in the first slab waveguide or two slab central axes formed in the second slab waveguide are orthogonal to each other.

10. The arrayed waveguide grating according to claim 2, wherein
at least one of an angle between two slab central axes formed in the first slab waveguide on a side interposed between the channel waveguide groups and an angle between two slab central axes formed in the second slab waveguide on a side interposed between the channel waveguide groups is smaller than 90 degrees.

\* \* \* \* \*